(12) United States Patent
Izumoto et al.

(10) Patent No.: US 7,926,521 B2
(45) Date of Patent: Apr. 19, 2011

(54) SEALING AGENT INJECTING APPARATUS, SEALING AGENT INJECTING METHOD AND SEALING PUMP UP APPARATUS

(75) Inventors: Ryuji Izumoto, Kodaira (JP); Daisuke Sugio, Kodaira (JP); Masaki Yoshida, Kodaira (JP); Yuji Takeda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1128 days.

(21) Appl. No.: 11/597,141

(22) PCT Filed: May 19, 2005

(86) PCT No.: PCT/JP2005/009125
§ 371 (c)(1),
(2), (4) Date: Nov. 20, 2006

(87) PCT Pub. No.: WO2005/113220
PCT Pub. Date: Dec. 1, 2005

(65) Prior Publication Data
US 2007/0221287 A1    Sep. 27, 2007

(30) Foreign Application Priority Data

May 20, 2004  (JP) ................. 2004-150055
Dec. 7, 2004  (JP) ................. 2004-353688
Dec. 7, 2004  (JP) ................. 2004-353689

(51) Int. Cl.
*B65B 1/04* (2006.01)
(52) U.S. Cl. ............. 141/105; 141/38; 141/67; 81/15.6; 137/602; 152/509
(58) Field of Classification Search ............. 141/5, 38, 141/44, 65–67, 98, 100, 104, 105, 114, 231, 141/285, 301–302, 313, 372; 222/372; 81/15.2, 81/15.6; 137/223–234.5, 597, 602, 605–607, 137/635.4; 152/509
See application file for complete search history.

(56) References Cited

U.S. PATENT DOCUMENTS
3,729,033 A * 4/1973 Bayerkohler ................. 141/231
(Continued)

FOREIGN PATENT DOCUMENTS
EP    0 972 616 A2    1/2000
(Continued)

OTHER PUBLICATIONS

European Search Report dated Sep. 10, 2010.

*Primary Examiner* — Gregory L Huson
*Assistant Examiner* — Jason K Niesz
(74) *Attorney, Agent, or Firm* — Sughrue Mion, PLLC

(57) ABSTRACT

To be able to simply carry out an operation of repairing a punctured pneumatic tire, to be able to inject a necessary amount of a sealing agent firmly into the pneumatic tire even when the apparatus is used in an inclined state and to prevent clogging of the sealing agent and leakage of a liquid by being pressurized.

A pump up apparatus 30 is an apparatus for injecting a sealing agent in a liquid state into a punctured pneumatic tire 38, thereafter, supplying compressed air into the pneumatic tire 38 to elevate an inner pressure thereof. The pump up apparatus 30 includes a sealing agent vessel 34 accommodating the sealing agent, a sealing agent injecting pump 42 for sucking the sealing agent from the sealing agent vessel 34 to feed it to the pneumatic tire 38, and a compressor 44 for pressurizing and sending air to the pneumatic tire 38. When the pneumatic tire 38 is punctured, the sealing agent injecting pump 42 sucks the sealing agent in the liquid state from the sealing agent vessel 34 to inject it to the pneumatic tire 38, therefore, inside of the sealing agent vessel 34 is not pressurized.

12 Claims, 17 Drawing Sheets

U.S. PATENT DOCUMENTS

| | | | |
|---|---|---|---|
| 5,403,417 A | 4/1995 | Dudley et al. | |
| 6,053,709 A * | 4/2000 | Reavis | 417/401 |
| 6,067,850 A * | 5/2000 | Lang et al. | 73/146.8 |
| 6,293,762 B1 * | 9/2001 | Farkhan | 417/234 |
| 6,705,360 B1 * | 3/2004 | Bonzer | 141/38 |
| 2002/0112777 A1 | 8/2002 | Fang et al. | |
| 2004/0149391 A1 * | 8/2004 | Shaffer | 156/404 |
| 2005/0056358 A1 * | 3/2005 | Eriksen et al. | 152/502 |

FOREIGN PATENT DOCUMENTS

| | | |
|---|---|---|
| EP | 1419876 A2 | 5/2004 |
| JP | 48-69383 | 6/1973 |
| JP | 48-73827 A | 10/1973 |
| JP | 3-210863 A | 9/1991 |
| JP | 09095111 | 4/1997 |
| JP | 11-207242 A | 8/1999 |
| JP | 3-210863 B2 | 7/2001 |
| JP | 2002-166713 A | 6/2002 |
| JP | 2002-292758 A | 10/2002 |
| JP | 2003-127242 A | 5/2003 |
| JP | 2003-190867 A | 7/2003 |

* cited by examiner

F I G. 4
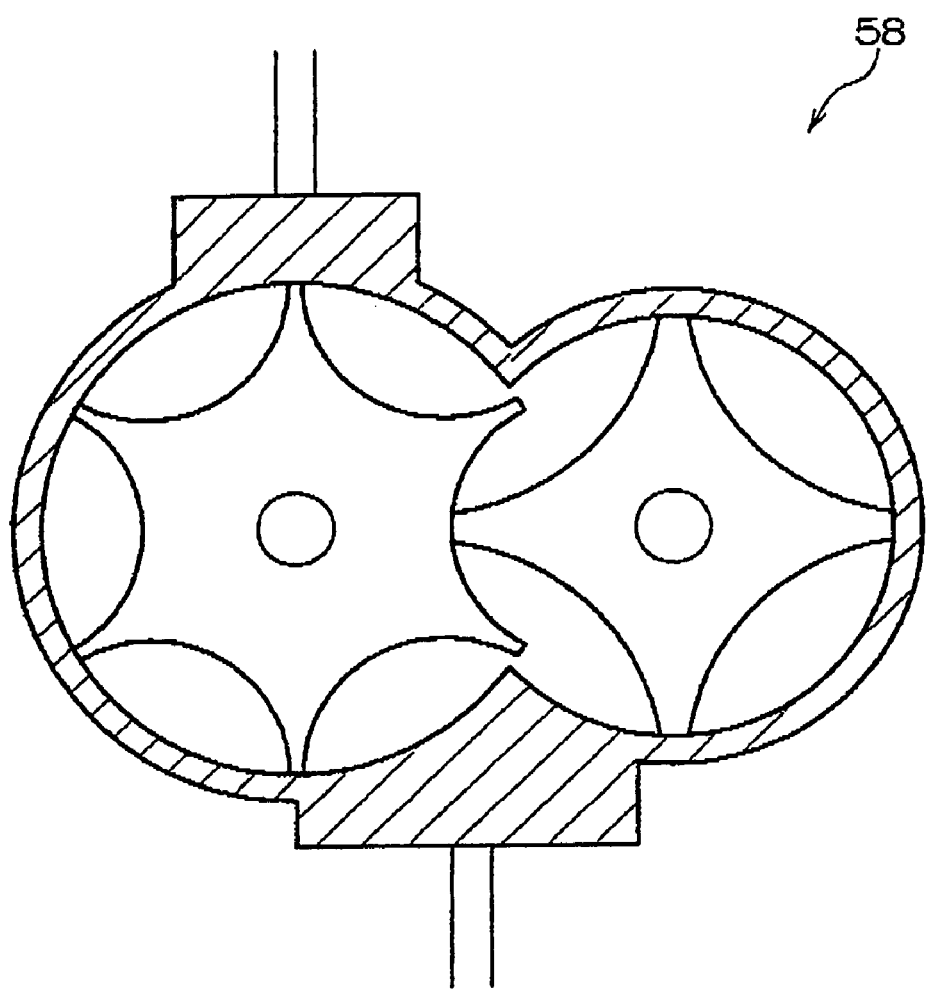

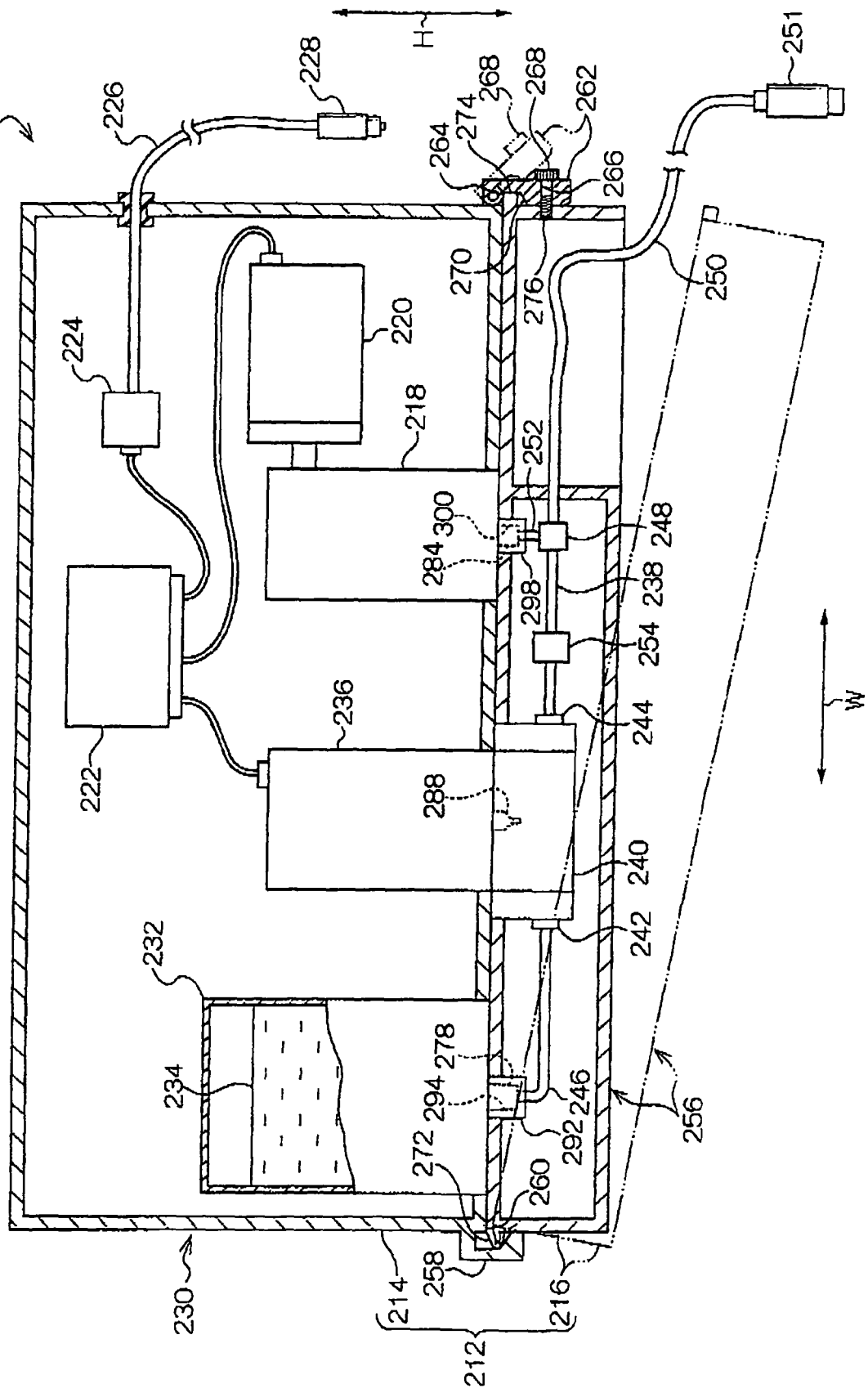

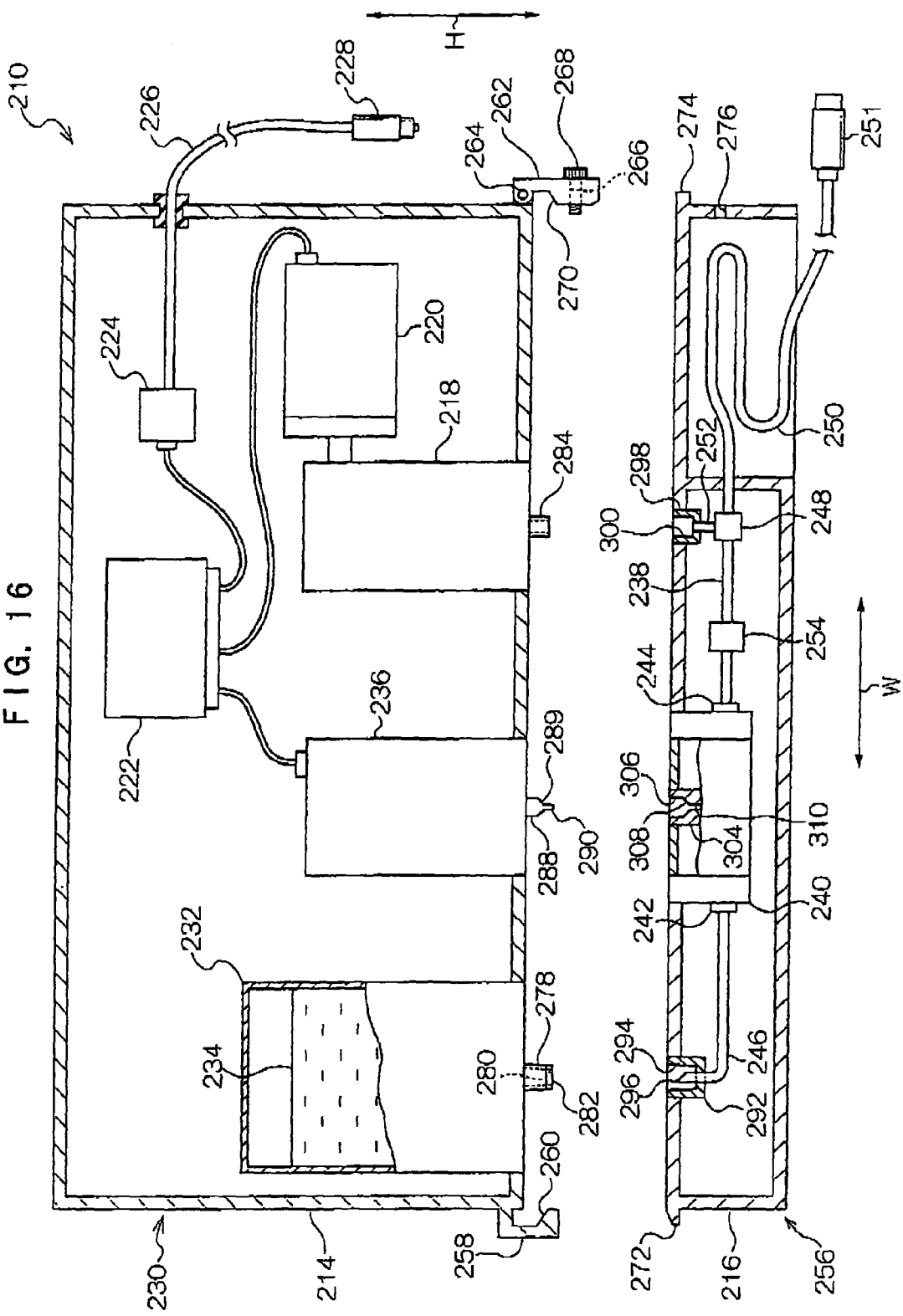

SEALING AGENT INJECTING APPARATUS, SEALING AGENT INJECTING METHOD AND SEALING PUMP UP APPARATUS

TECHNICAL FIELD

The present invention relates to a sealing agent injecting apparatus and a sealing injecting method used for injecting a sealing agent for sealing a punctured pneumatic tire into the pneumatic tire as well as a sealing pump up apparatus for injecting a sealing agent for sealing a punctured pneumatic tire into the pneumatic tire, thereafter, elevating an inner pressure of the pneumatic tire by supplying compressed air into the pneumatic tire.

BACKGROUND ART

In recent years, there has been spread a sealing pump up apparatus (hereinafter, simply referred as "pump up apparatus") for repairing a tire by a sealing agent and pumping up an inner pressure thereof to a predetermined reference pressure without interchanging a tire and a wheel. There is known a pump up apparatus of this kind described in, for example, Patent Reference 1. As shown by FIG. 17, a pump up apparatus 20 described in Patent Reference 1 includes a pressure vessel 4 containing a sealing agent 6, and an air compressor 1 constituting a supply source of compressed air. The air compressor 1 is connected to a gas introducing portion 3 of the pressure vessel 4 by way of a hose 2. Further, the gas introducing portion 3 is made to constitute a riser tube which can be closed by a plug valve 5 and extended to above a liquid level of the sealing agent 6 contained in the pressure vessel 4. The pressure vessel 4 includes an outlet valve 7 for delivering the sealing agent 6, one end portion of a hose 8 is connected to the outlet valve 7, other end portion of the hose 8 is attached with an adaptor 9 screwed to a tire valve 10.

According to the pump up apparatus 20, when a tire is punctured, the adaptor 9 is screwed to the tire valve 10, thereafter, the gas introducing portion 3 of the pressure vessel 4 is opened by the plug valve 5. Under the state, the air compressor 1 is operated to introduce compressed air from the air compressor 1 into the pressure vessel 4 by way of the gas introducing portion 3. Thereby, an inner pressure of a gas layer portion above the sealing agent 6 at inside of the pressure vessel 4 is elevated, the sealing agent 6 is extruded from the outlet valve 7 by a static pressure of the air layer portion, and the sealing agent 6 is injected into the tire by way of the tire valve 10. Thereafter, when the liquid level of the sealing agent 6 at inside of the pressure vessel 4 is lowered to an opening of the outlet valve 7, compressed air at inside of the pressure vessel 4 is supplied to inside of the air by way of the outlet valve 7 and the hose 8 to expand the tire by a predetermined inner pressure.

Patent Reference 1: Japanese Patent Publication No. 3210863

DISCLOSURE OF THE INVENTION

Problems that the Invention is to Solve

However, according to the pump up apparatus 20 described in Patent Reference 1, the air pressure of the gas layer portion at inside of the pressure vessel 4 is elevated, the sealing agent 6 is extruded from the pressure vessel 4 by the pressure (static pressure) of air and therefore, unless pressure resistance of the pressure vessel 4 is made to be sufficiently high to withstand the air pressure at high pressure, the sealing agent cannot be supplied from inside of the pressure vessel 4 to the tire by a sufficient supply velocity, or leakage of the sealing agent by destructing the pressure vessel 4 cannot firmly be prevented.

In consideration of the above-described fact, it is an object of the invention to provide a sealing agent injecting apparatus, a sealing agent injecting method and a sealing pump up apparatus capable of supplying a sealing agent at inside of a sealing agent vessel to a pneumatic tire normally by a high supply velocity even when pressure resistance of the sealing agent vessel is low.

Means for Solving the Problems

A sealing agent injecting apparatus according to a non-limiting embodiment of the invention is a sealing agent injecting apparatus that injects a sealing agent in a liquid state into a punctured pneumatic tire, the sealing agent injecting apparatus comprising: a sealing agent vessel containing the sealing agent; and a sealing agent pump that sucks the sealing agent from inside of the sealing agent vessel to feed the sealing agent to inside of the pneumatic tire.

When the pneumatic tire is punctured, the sealing agent pump sucks the sealing agent in the liquid state from the sealing agent vessel to inject it into the pneumatic tire.

Therefore, when supplying the sealing agent from the sealing agent vessel to the pneumatic tire, the sealing agent vessel is not pressurized by a pressure (positive pressure) of air and the sealing agent. Thereby, even when pressure resistance of the sealing agent vessel is low, the sealing agent at inside of the sealing agent vessel can be supplied to the pneumatic tire by a high supply velocity. Further, the sealing agent vessel is not destructed by being pressurized and therefore, it does not occur that sealing agent cannot be supplied to due to breakage of the sealing agent vessel.

A sealing agent injecting method according to a non-limiting embodiment of the invention is a sealing agent injecting apparatus for injecting a sealing agent in a liquid state into a punctured pneumatic tire; wherein the sealing agent is fed to inside of the pneumatic tire while sucking the sealing agent from inside of a sealing agent vessel by a sealing agent pump.

When the pneumatic tire is punctured, the sealing agent is injected into the pneumatic tire while sucking the sealing agent in the liquid state from the sealing agent vessel by the sealing agent pump.

Therefore, when supplying the sealing agent from the sealing agent vessel to the pneumatic tire, the sealing agent vessel is not pressurized by a pressure (positive pressure) of air and the sealing agent. Thereby, even when pressure resistance of the sealing agent vessel is low, the sealing agent at inside of the sealing agent vessel can be supplied to the pneumatic tire by a high supply velocity. Further, the sealing agent vessel is not destroyed by being pressurized and therefore, it does not occur that the sealing agent is not unable to be supplied due to break of the sealing agent vessel. Further, even when the apparatus (sealing agent vessel) is used in an inclined state, the sealing agent at inside of the sealing agent vessel can be injected into the pneumatic tire while compressing to deform the sealing agent vessel by a negative pressure from the sealing agent pump, therefore, the sealing agent remaining at inside of the sealing agent vessel can sufficiently be reduced after finishing to supply the sealing agent to the pneumatic tire.

A sealing agent injecting method according to a non-limiting embodiment of the invention is a sealing agent injecting method in which a sealing agent vessel is compressed to deform by a negative pressure from a sealing agent pump while sucking a sealing agent from inside of the sealing agent vessel by the sealing agent pump, and the sealing agent is squeezed out from inside of the sealing agent vessel to feed the sealing agent to inside of a pneumatic tire. The sealing agent at inside of the sealing agent vessel can be injected into the pneumatic tire while compressing to deform the sealing agent vessel by the negative pressure from the sealing agent pump and therefore, even when the sealing agent vessel is used in the inclined state, the sealing agent remaining at inside of the sealing agent vessel can sufficiently be reduced after finishing to supply the sealing agent to the pneumatic tire.

A sealing pump up apparatus according to a non-limiting embodiment of the invention is a sealing pump up apparatus that injects a sealing agent in a liquid state into a punctured pneumatic tire, thereafter, elevates an inner pressure by supplying compressed air into the pneumatic tire, the sealing pump up apparatus comprising: a sealing agent vessel containing the sealing agent; a sealing agent pump that sucks the sealing agent from the sealing agent vessel to feed the sealing agent to the pneumatic tire; and an air compressor that pressurizes and sends air to the pneumatic tire.

When the pneumatic tire is punctured, the sealing agent pump sucks the sealing agent in the liquid state from the sealing agent vessel and injects the sealing agent into the pneumatic tire.

Therefore, when supplying the sealing agent from the sealing agent vessel to the pneumatic tire, the sealing agent vessel is not pressurized by a pressure (positive pressure) of air and the sealing agent. Thereby, even when pressure resistance of the sealing agent vessel is low, the sealing agent at inside of the sealing agent vessel can be supplied to the pneumatic tire by a high supply velocity. Further, the sealing agent vessel is not destroyed by being pressurized and therefore, it does not occur that the sealing agent is unable to be supplied to due to break the sealing agent vessel.

Further, after injecting a predetermined amount of the sealing agent to the pneumatic tire, pressurized air is supplied into the pneumatic tire by the compressor to elevate the inner pressure. Further, after subjecting the pneumatic tire to preliminary running as necessary, the inner pressure is elevated to a normal air pressure to finish repairing puncture. Therefore, operation of repairing the punctured pneumatic tire can simply be carried out.

The sealing pump up apparatus according to a non-limitingembodiment of the invention is characterized in that the sealing agent pump and the air compressor individually include power sources.

In the sealing pump up apparatus according to a non-limiting embodiment, by providing the power sources individually to the sealing agent pump and the air compressor, the power sources respectively suitable for the sealing agent pump and the compressor can be provided.

The sealing pump up apparatus according to a non-limiting embodiment of the invention is characterized in that the sealing agent pump and the air compressor include a common power source.

According to the sealing pump up apparatus according to a non-limiting embodiment of the invention, by providing the common power source for the sealing agent pump and the air compressor, a number of parts of the apparatus can be reduced and space saving formation or light-weighted formation can be achieved.

The sealing pump up apparatus according to a non-limiting embodiment of the invention is characterized in that any of a vane type pump, a reciprocal type pump, a screw type pump, and a gear pump is used as the sealing agent pump in the sealing pump up apparatus.

According to the sealing pump up apparatus according to a non-limiting embodiment of the invention, by constituting the sealing agent pump by the vane type, the reciprocal type, or the screw type pump, or the gear pump, the sealing agent pump can be a pump of a small-sized and a large flow rate.

The sealing pump up apparatus according to a non-limiting embodiment of the invention of the invention is characterized in that one of a reciprocal type air compressor and a screw type air compressor is used as the air compressor in the sealing pump up apparatus.

According to the sealing pump up apparatus according to a non-limiting embodiment of the invention, by constituting the compressor by the reciprocal type or the screw type compressor, the compressor can be a compressor which is small-sized and capable of supplying compressed air to the pneumatic tire by a high pressure.

The sealing pump up apparatus according to a non-limiting embodiment of the invention comprises: a common pump that feeds a fluid to the pneumatic tire while sucking the fluid from outside by way of a suction port; and switching means for selectively communicating the suction port to one of the sealing agent vessel and an outside space; wherein the common pump the suction of which is communicated with the sealing agent vessel by the switching means is used as the sealing agent pump, and the common pump the suction port of which is communicated with the outside space by the switching means is used as the air compressor.

By using the common pump the suction port of which is communicated with the sealing agent vessel by the switching means as the sealing agent pump and using the common pump the suction port of which is communicated with the outside space by the switching means as the air compressor, when the suction port of the common pump is connected to the sealing agent vessel by the switching means, the common pump can be used as the sealing agent pump, further, when the suction port of the common pump is connected to the outside space, the common pump can be used as the compressor, therefore, a number of parts of the apparatus can be reduced and space saving formation and light-weighted formation can be achieved.

The sealing pump up apparatus according to a non-limiting embodiment of the invention comprises: inner pressure detecting means for detecting an inner pressure of the pneumatic tire and outputting a detecting signal in correspondence with a detected value of the inner pressure; inner pressure setting means for setting a designated value of the inner pressure previously designated for the pneumatic tire in accordance with an operation from outside of the apparatus; and pressure elevation stopping means for determining the inner pressure of the pneumatic tire to which air is pressurized and sent by the air compressor based on the detecting signal from the inner pressure detecting means, and stopping pressurizing and sending air from the air compressor to the pneumatic tire when the inner pressure of the pneumatic tire reaches the designated value.

The sealing pump up apparatus according to a non-limiting embodiment of the invention comprises: inner pressure setting means for setting a designated value of the inner pressure previously designated for the pneumatic tire in accordance with an operation from outside of the apparatus; and a pressure adjusting valve for stopping elevating the pressure of the pneumatic tire by exhausting air pressurized and sent by the air compressor to outside when the inner pressure of the pneumatic tire reaches the designated value.

The sealing pump up apparatus according to a non-limiting embodiment of the invention comprises: inner pressure informing means for visually or vocally informing, to outside of the apparatus, of that the inner pressure of the pneumatic tire reaches the designated value when the inner pressure of the pneumatic tire reaches the designated value.

The sealing pump up apparatus according to a non-limiting embodiment of the invention comprises: a pump motor that transmits a torque to the sealing agent pump; a gas/liquid common pipe an one end portion of which is connected to the sealing agent injecting pump and another end portion of which is connectably and disconnectably connected to the pneumatic tire; a branch pipe which is branched from a middle portion of the sealing agent pump and the pneumatic tire in the gas/liquid common pipe, and is connected to the air compressor; and an attachable/detachable unit which is attachable and detachable to and from a main body portion of the apparatus at which the sealing agent vessel, the pump motor and the air compressor are arranged, and at which the sealing agent pump, the gas/liquid common pipe and the branch pipe are respectively mounted; wherein, when the attachable/detachable unit is installed to the main body portion, in cooperation with an operation of installing the attachable/detachable unit to the main body portion, the sealing agent pump and the branch pipe are respectively connected to the sealing agent vessel and the air compressor and the pump motor is connected to the sealing agent pump so as to be able to transmit the torque.

According to the sealing pump up apparatus according to a non-limiting embodiment of the invention when the attachable/detachable unit is installed to the main body portion, by respectively connecting the suction pump and the branch pipe to the liquid agent vessel and the air compressor and connecting the pump motor to the suction pump in cooperation with the operation of installing the attachable/detachable unit, therefore, the apparatus can be brought into an operable state by assembling unused suction pump, the branch pipe and the suction pump to the main body portion respectively as portions of the apparatus by only carrying out the installing operation of mounting the attachable/detachable unit to the main body portion from which the used attachable/detachable unit is removed.

That is, according to the sealing pump up apparatus of the conventional art, when the apparatus is operated for repairing the punctured pneumatic tire, the sealing agent contained at inside of the liquid agent vessel flows at inside of a constituent part such as the gas/liquid common pipe or the like and therefore, after finishing to repair the pneumatic tire, unless the sealing agent remaining at inside of the constituent part of the apparatus through which the sealing agent flows such as the gas/liquid common pipe or the like is completely removed by cleaning or the like, or unless the constituent part of the apparatus including the gas/liquid common pipe and the like is changed by a new one, it is not able to be used for repairing the punctured pneumatic tire again. Therefore, according to the sealing pump up apparatus of the conventional art, a plurality of constituent parts including the gas/liquid common pipe and the like are disassembled from the main body portion piece by piece and the parts are cleaned or changed.

In contrast thereto, according to the sealing pump up apparatus according to a non-limiting embodiment of the invention, although when the suction pump is operated by the torque from the drive motor, the sealing agent sucked from inside of the liquid agent vessel by the suction pump flows insides of the suction pump and the gas/liquid common pipe, since the suction pump and the gas/liquid common pipe are mounted to the attachable/detachable unit, by only installing a new attachable/detachable unit to the main body portion from which the used attachable/detachable unit is previously removed, that is, by only carrying out the operation of installing the attachable/detachable unit to the main body portion once, the constituent parts of the apparatus including the suction pump and the gas/liquid common pipe can be changed (assembled) by new ones.

As a result, in comparison with the case of assembling the constituent parts of the apparatus including the suction pump and the gas/liquid common pipe piece by piece, the constituent parts which is needed to be changed for using the apparatus again can simply be assembled to the main body portion, further, also a time period of assembling the constituent parts to the main body portion can considerably be shortened.

The sealing pump up apparatus according to a non-limiting embodiment of the invention is, characterized in that, when the attachable/detachable unit is detached from the main body portion, in cooperation with an operation of detaching the attachable/detachable unit from the main body portion, the sealing agent pump and the branch pipe are respectively separated from the sealing agent vessel and the air compressor and the sealing agent pump is separated from the pump motor.

When the attachable/detachable unit is separated from the main body portion, by separating the suction pump and the branch pipe respectively from the liquid agent vessel and the air compressor and separating the suction pump from the pump motor in cooperation with the operation of separating the attachable/detachable unit, after repairing the punctured pneumatic tire, by only carrying out the separating operation of removing the attachable/detachable unit from the main body portion, the constituent parts including the used suction pump and the gas/liquid common pipe can be removed from the main body portion and therefore, in comparison with the case of disassembling the constituent parts of the apparatus including the suction pump and the gas/liquid common pipe piece by piece from the main body portion, the constituent parts which need to be changed for using the apparatus again can simply be disassembled from the main body portion and also a time period of disassembling the constituent parts from the main body portion can considerably be shortened.

The sealing pump up apparatus according to a non-limiting embodiment of the invention is characterized in that the attachable/detachable unit is mounted with a check valve for hampering the sealing agent and compressed air from flowing back to the sealing agent pump from a side of the pneumatic tire by way of the gas/liquid common pipe.

The sealing pump up apparatus according to a non-limiting embodiment of the invention is characterized in that the sealing agent vessel is attachably and detachably mounted to the main body portion.

Advantage of the Invention

As has been explained above, according to the sealing agent injecting apparatus, the sealing agent injecting method and the sealing pump up apparatus of the invention, even when the pressure resistance of the sealing agent vessel is low, the sealing agent at inside of the sealing agent vessel can normally be supplied to the pneumatic tire by a high supply velocity.

BRIEF DESCRIPTION OF THE DRAWINGS

FIG. 4 is a sectional view of an essential portion of a modified example of the sealing agent pump constituting the sealing pump up apparatus according to the first embodiment of the invention.

FIG. 15 is a side sectional view showing a constitution of a sealing pump up apparatus according to a seventh embodiment of the invention, showing a state of mounting an attachable/detachable unit to a main body portion.

FIG. 16 is a side sectional view showing a state of detaching an attachable/detachable unit from a main body portion of the sealing pump up apparatus shown in FIG. 1.

BEST MODE FOR CARRYING OUT THE INVENTION

An explanation will be given of sealing pump apparatus according to embodiments of the invention as follows.

First Embodiment (Constitution of Sealing Pump Up Apparatus)

Figure 1:
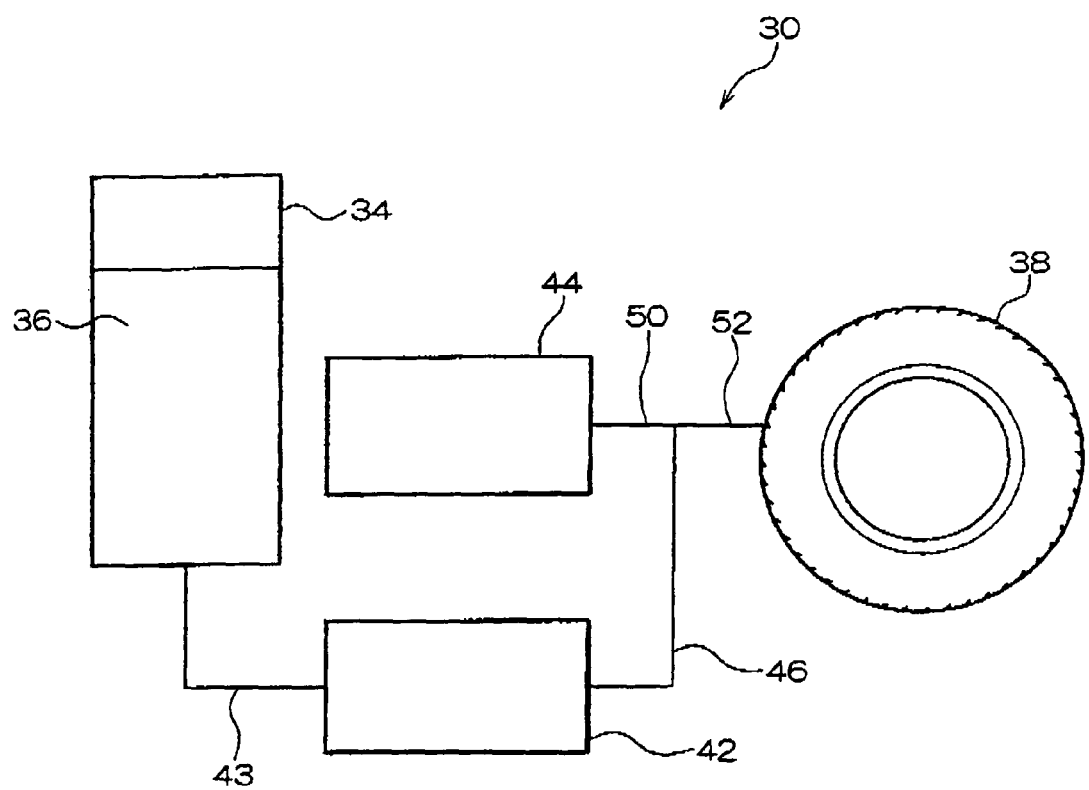
FIG. 1 is a conceptual view showing a constitution of a sealing pump up apparatus according to a first embodiment of the invention.
Figure 2:
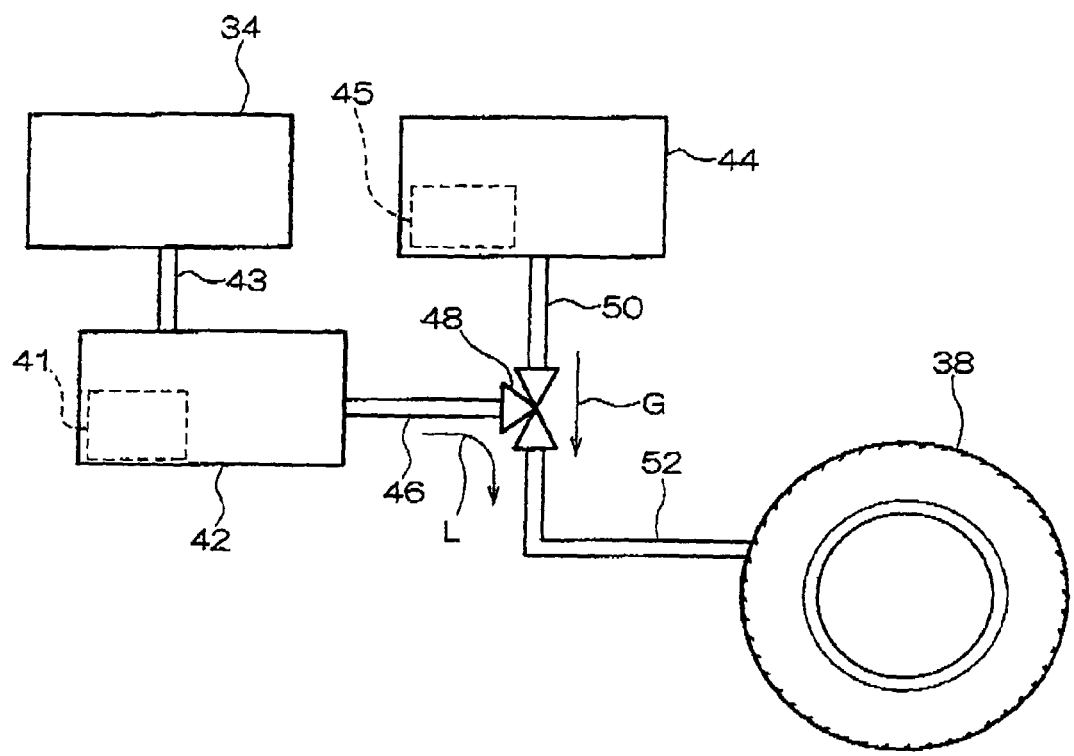
FIG. 2 is a schematic view showing the constitution of the sealing pump up apparatus according to the first embodiment of the invention.

FIG. 1 and FIG. 2 show a sealing pump apparatus (hereinafter, simply referred to as "pump up apparatus") according to a first embodiment. When a pneumatic tire mounted to a vehicle of an automobile or the like is punctured, a pump up apparatus 30 repairs the tire by a sealing agent and pressurizes (pumps up) an inner pressure thereof to a predetermined reference pressure again.

The pump up apparatus 30 includes a sealing agent vessel 34 containing a sealing agent 36, a sealing agent pump 42 for sucking the sealing agent 36 from the sealing agent vessel 34 to be fed to a pneumatic tire 38, and a compressor 44 for pressurizing air to the pneumatic tire 38.

As shown by FIG. 2, the sealing agent pump 42 and the compressor 44 are individually provided with motors (power sources) 41, 45 adapted to respectives thereof.

A suction side of the sealing agent pump 42 is connected with a downstream end of a sealing agent sucking pipe 43, and an upstream end of the sealing agent sucking pipe 43 is connected to the sealing agent vessel 34. A delivery side of the sealing agent pump 42 is connected with a sealing agent supplying pipe 46, and a downstream end of the sealing agent supplying pipe 46 is connected to a three way valve 48 (refer to FIG. 2).

Further, a delivery side of the compressor 44 is connected with an air supplying pipe 50, and a downstream end of the air supplying pipe 50 is connected to the three way valve 48. A delivery side of the three way valve 48 is connected with a common pipe 52. At a downstream end of the common pipe 52, an adapter (not illustrated) capable of being connected to a tire valve (not illustrated) of the pneumatic tire 38 is provided.

All of the sealing agent supplying pipe 46, the air supplying pipe 50, the common pipe 52 are pipes in shapes of flexible hoses.

A flow path direction of the three way valve 48 can be switched to either of a sealing agent flow path direction L of flowing from the sealing agent pump 42 to the pneumatic tire 38 and a compressed air flow path direction G of flowing from the compressor 44 to the pneumatic tire 38. The three way valve 48 may be provided with a check valve.

Figure 3:
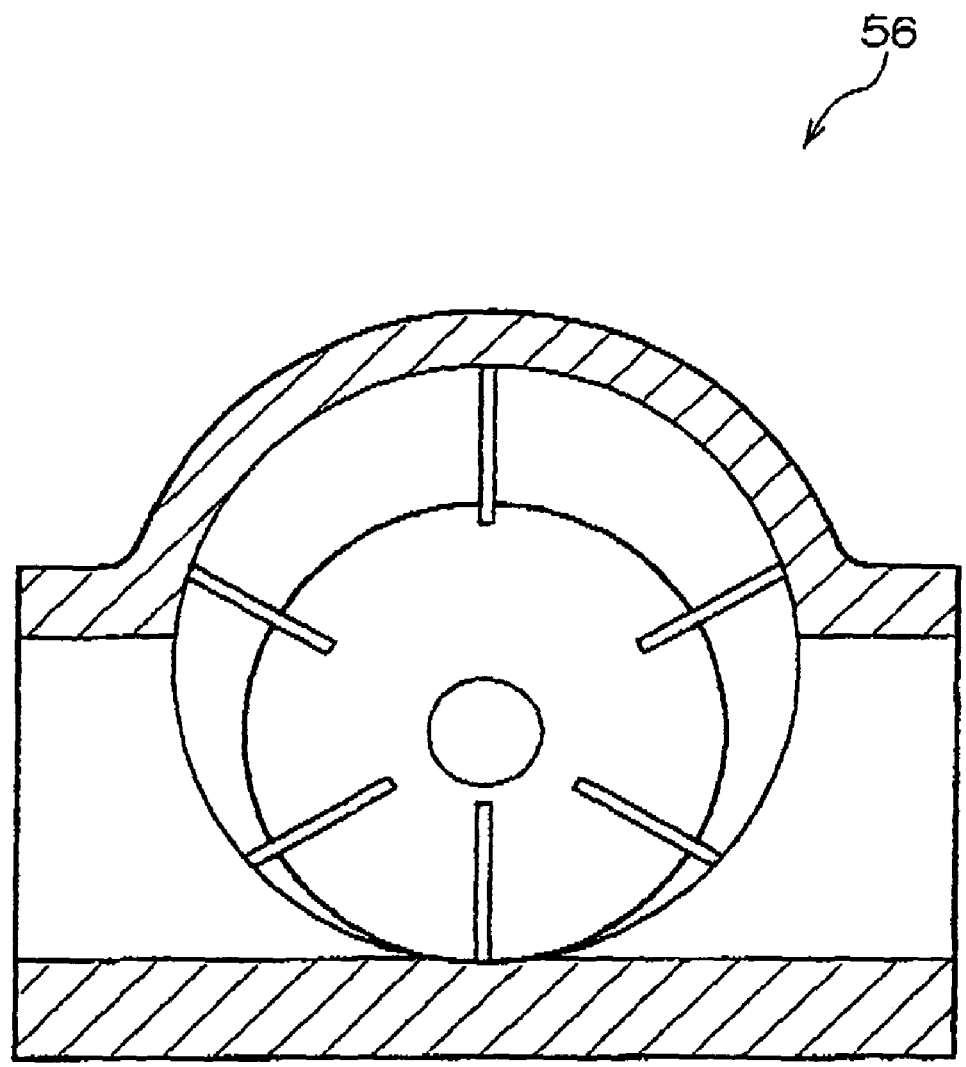
FIG. 3 is a sectional view of an essential portion of a sealing agent pump constituting the sealing pump up apparatus according to the first embodiment of the invention.

As the sealing agent pump 42, there is used a small-sized and large flow rate pump, which is a vane type pump 56 as shown by FIG. 3 according to the embodiment.

Figure 10:
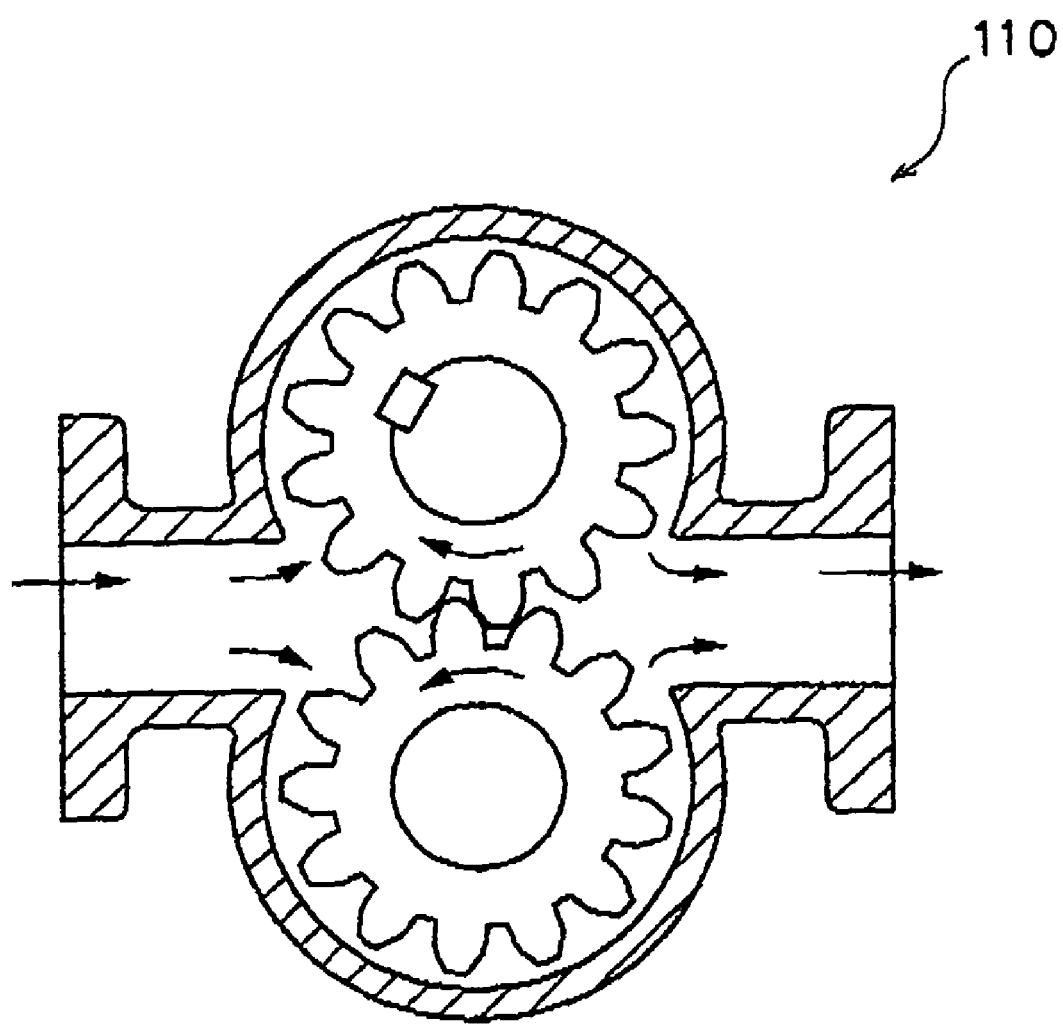
FIG. 10 is a sectional view showing a constitution of a gear pump applicable as the sealing agent pump in the sealing pump up apparatus according to the first embodiment of the invention.

Further, the sealing agent pump 42 may be a screw type pump 58 shown in FIG. 4, or a gear pump 110 shown in FIG. 10. Particularly, the gear pump 110 is excellent in an efficiency of feeding the sealing agent 36 which is a highly viscous liquid and easy to control also a supply velocity and therefore, suitable for supplying the sealing agent 36 to the tire 38. Further, a reciprocal type (heart/lung type) pump explained in a second embodiment, a third embodiment will do.

Figure 8:
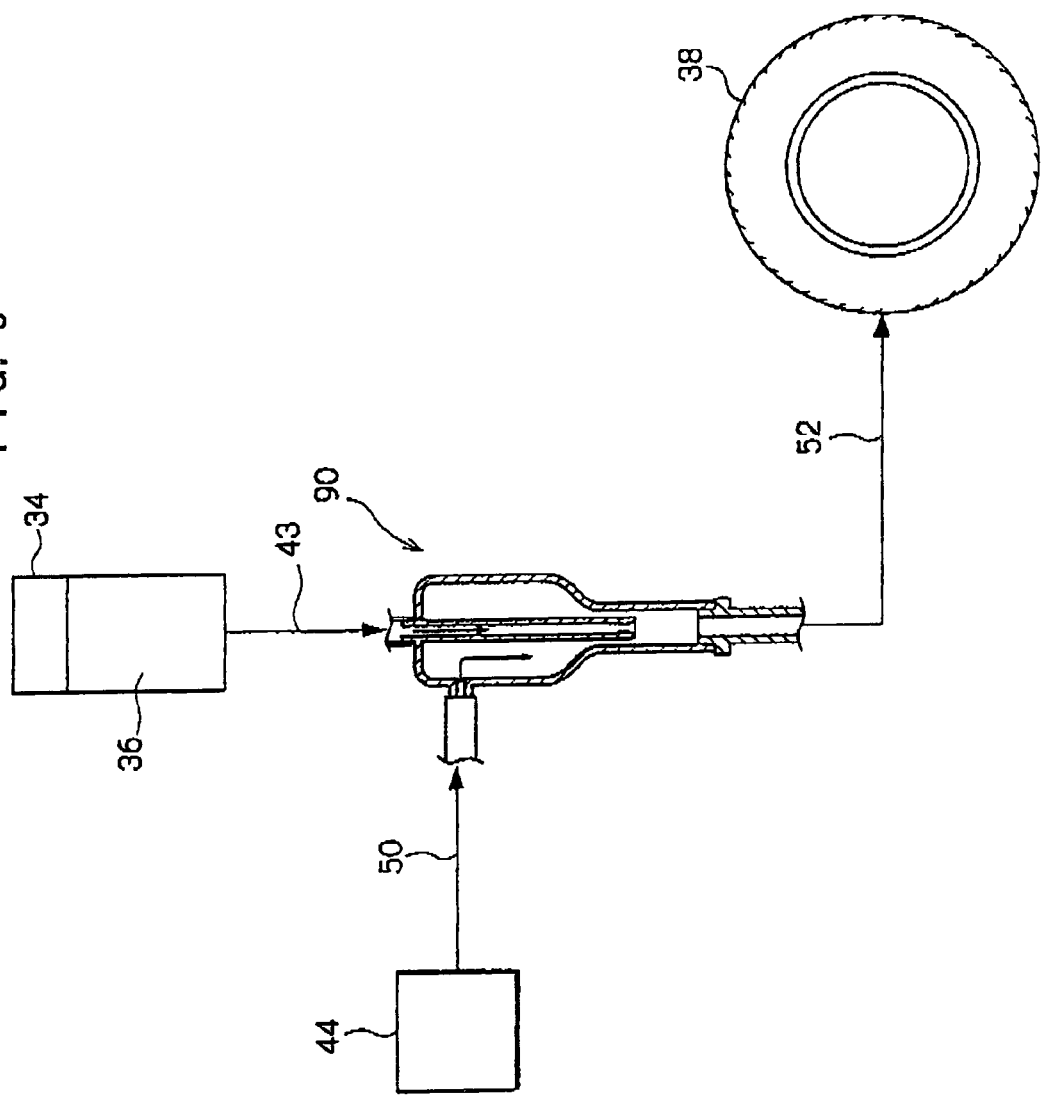
FIG. 8 is a sectional view of an essential portion of the sealing agent pump constituting the sealing pump apparatus according to the first embodiment of the invention.

Further, as the sealing agent pump 42, as shown by FIG. 8, there may be used a venturi type pump 90 supplied with compressed air from the compressor 44, sucking the sealing agent 36 from inside of the sealing agent vessel 34, and feeding the sealing agent 36 into the pneumatic tire 38 by compressed air. When the venturi type pump 90 is used, compressed air can be supplied into the pneumatic tire 38 simultaneously with supplying the sealing agent 36 to the pneumatic tire 38, after completely discharging the sealing agent 36 from the sealing agent vessel 34, compressed air supplied from the compressor 44 is supplied into the pneumatic tire 38 by passing inside of the venturi type pump 90 without carrying out switching operation for switching means of a three way valve or the like.

(Operation of Sealing Pump Up Apparatus)

An explanation will be given of an operational procedure of repairing the punctured pneumatic tire 38 by using the pump up apparatus 30 according to the embodiment as follows.

When the pneumatic tire 38 is punctured, first, an operator screws the adapter to the tire valve (not illustrated) of the pneumatic tire 38 and connects the common pipe 52 to the pneumatic tire.

Next, the sealing agent 36 in a liquid state is sucked and injected into the pneumatic tire 38 by driving the sealing agent pump 42. Further, a switch of the compressor 44 is made ON to be brought into a usable state.

After injecting a predetermined amount of the sealing agent to the pneumatic tire 38, by switching the three way valve 48, compressed air is fed from the compressor 44 to the pneumatic tire 38 to elevate an inner pressure of the pneumatic tire 38 to a predetermined pressure.

Further, the adapter is detached from the tire valve of the pneumatic tire 38, and preliminary running is carried out over a constant distance by using the pneumatic tire 38 within a constant time period constituting a state in which the sealing agent injected into the pneumatic tire 38 is not hardened. As a result, the sealing agent is uniformly dispersed to inside of the pneumatic tire 38, and the sealing agent is filled in a puncture hole to close the puncture hole.

After finishing the preliminary running, the operator connects the adapter to the tire valve of the pneumatic tire 38 again to elevate the inner pressure of the pneumatic tire 38 to a rectified inner pressure by operating the compressor 44. Thereby, the puncture of the pneumatic tire 38 is finished to be repaired. By detaching the adapter from the tire valve of the pneumatic tire 38, normal running using the pneumatic tire 38 can be carried out. The operation of repairing the punctured pneumatic tire 38 can simply be carried out.

As explained above, according to the pump up apparatus 30 of the embodiment, the sealing agent 36 is sucked from the sealing agent vessel 34 by the sealing agent pump 42 to be fed to the pneumatic tire 38.

Therefore, in supplying the sealing agent 36 from the sealing agent vessel 34 to the tire 38, the sealing agent vessel 34 is not pressurized by a pressure (positive pressure) of air and the sealing agent 36. Thereby, even when pressure resistance of the sealing agent vessel 34 is low, the sealing agent 36 at inside of the sealing agent vessel 34 can firmly be supplied to the tire 38 by a high supply velocity. Further, the sealing agent vessel 34 is not destructed by being pressurized and therefore, impossible of supplying the sealing agent 36 due to failure of the sealing agent vessel 34 does not occur.

Further, it is not necessary to constitute the sealing agent vessel 34 by a pressure vessel but the sealing agent vessel 34 can be constituted by an aluminum pack, or a resin pack made of a resin of polypropylene, nylon, vinyl chloride or the like. Thereby, the sealing agent vessel 34 can be constituted by a vessel in a shape of a flexible bag excellent in a property of preserving the sealing agent in the liquid state. As a result, according to the pump up apparatus 30, the sealing agent 36 at inside of the sealing agent vessel 34 can be injected into the tire 38 while compressing to deform the sealing agent vessel 34 by a negative pressure from the sealing agent pump 42 and therefore, even when the sealing agent vessel 34 is used in an inclined state, after finishing to supply the sealing agent 36 to the tire 38, the sealing agent 36 remaining at inside of the sealing agent vessel 34 can sufficiently be reduced, and the puncture hole can be prevented from being sealed incompletely by a deficiency in supplying the sealing agent 36.

Second Embodiment

Next, a second embodiment will be explained. A pump up apparatus 60 according to the second embodiment differs from the first embodiment in providing a common power source for driving a sealing agent pump and a compressor.

Figure 5:
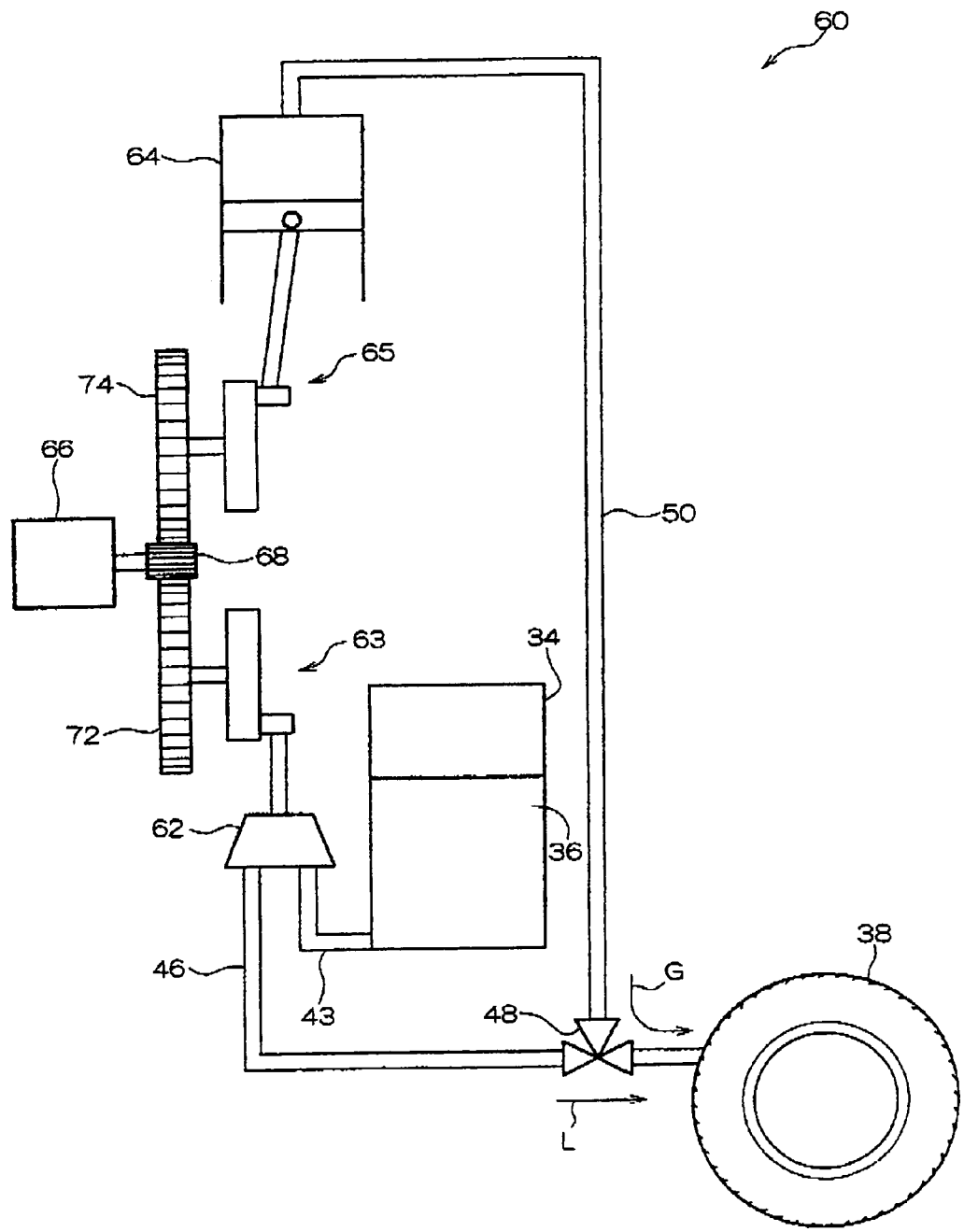
FIG. 5 is a schematic view showing a constitution of a sealing pump up apparatus according to a second embodiment of the invention.

As shown by FIG. 5, the pump up apparatus 60 is provided with a sealing agent pump 62 for supplying the sealing agent 36 to the pneumatic tire 38, a compressor 64 for feeding compressed air to the pneumatic tire 38, and a common motor 66 for driving the sealing agent pump 62 and the compressor 64. According to the embodiment, the sealing agent pump 62 is a reciprocal type pump, and the compressor 64 is a reciprocal type (heart/lung type) compressor.

A rotating shaft of the motor 66 is attached with a gear 68, and the pump up apparatus 60 is provided with a sealing agent pump drive gear 72 and a compressor drive gear 74 brought in mesh with the gear 68.

A rotating shaft of the sealing agent pump drive gear 72 is attached with a crank mechanism 63 for reciprocally operating the sealing agent pump 62, and a rotating shaft of the compressor drive gear 74 is attached with a crank mechanism 65 for reciprocally operating the compressor 64.

When the punctured pneumatic tire 38 is repaired by using the pump up apparatus 60, according to the embodiment, both of the sealing agent pump 62 and the compressor 64 are brought into a driving state by rotating the motor 66.

Further, injection of the sealing agent 36 to the pneumatic tire 38 and injection of compressed air thereafter are carried out by switching the three way valve 48.

As has been explained above, according to the embodiment, there is provided the motor 66 constituting the common power source for driving the sealing agent pump 62 and the compressor 64. Thereby, a number of parts of the pump up apparatus 60 can be reduced, and space saving formation or light-weighted formation can be achieved.

Third Embodiment

Figure 6:
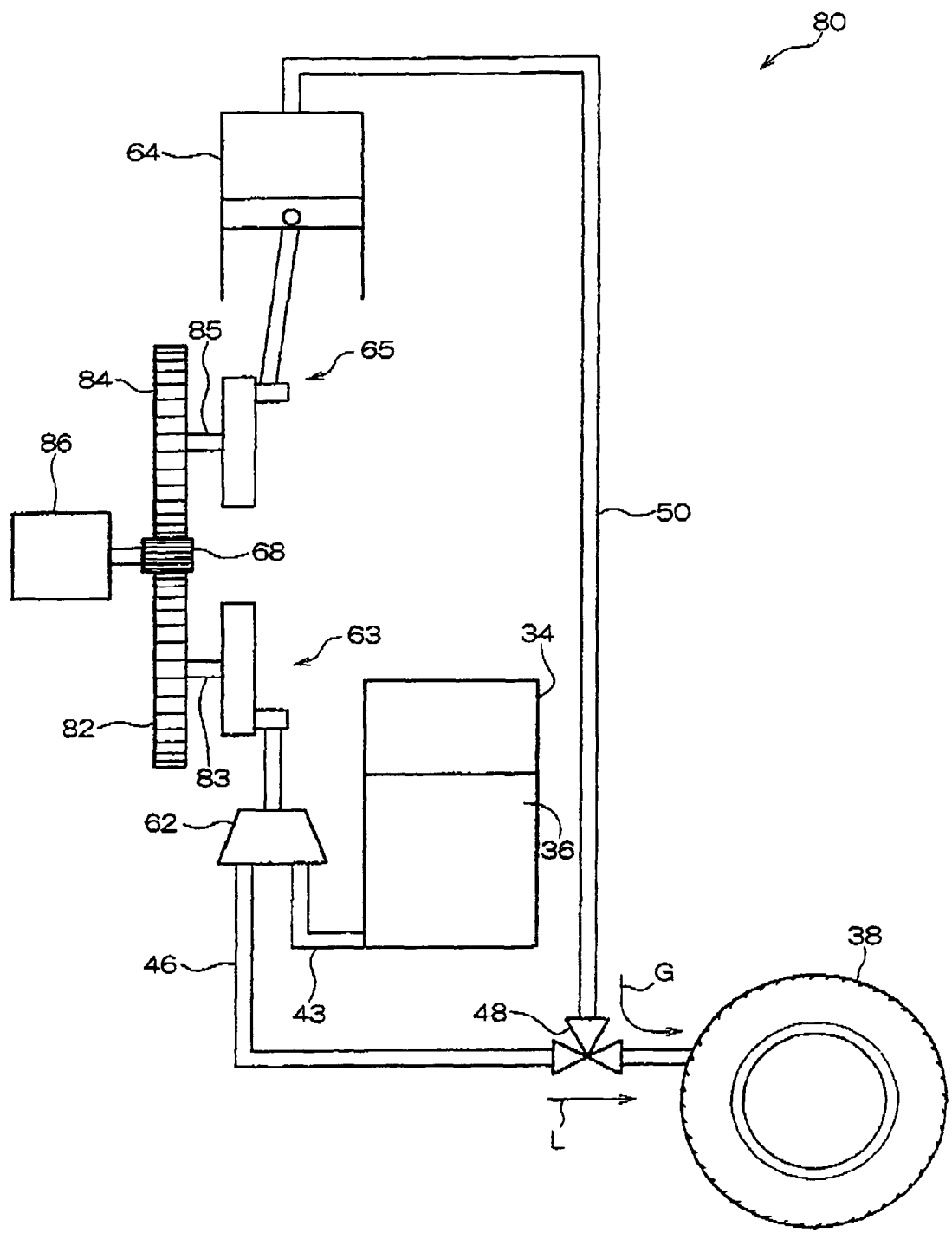
FIG. 6 is a schematic view showing a constitution of a sealing pump up apparatus according to a third embodiment of the invention.

Next, a third embodiment will be explained. As shown by FIG. 6, a pump up apparatus 80 according to the third embodiment is provided with a motor 86 having a reversible rotational direction, a sealing agent pump drive gear 82 and a compressor drive gear 84 respectively brought in mesh with the gear 68 attached to a rotating shaft of the motor 86. The other constituent elements are the same as those of the second embodiment.

Figure 7:
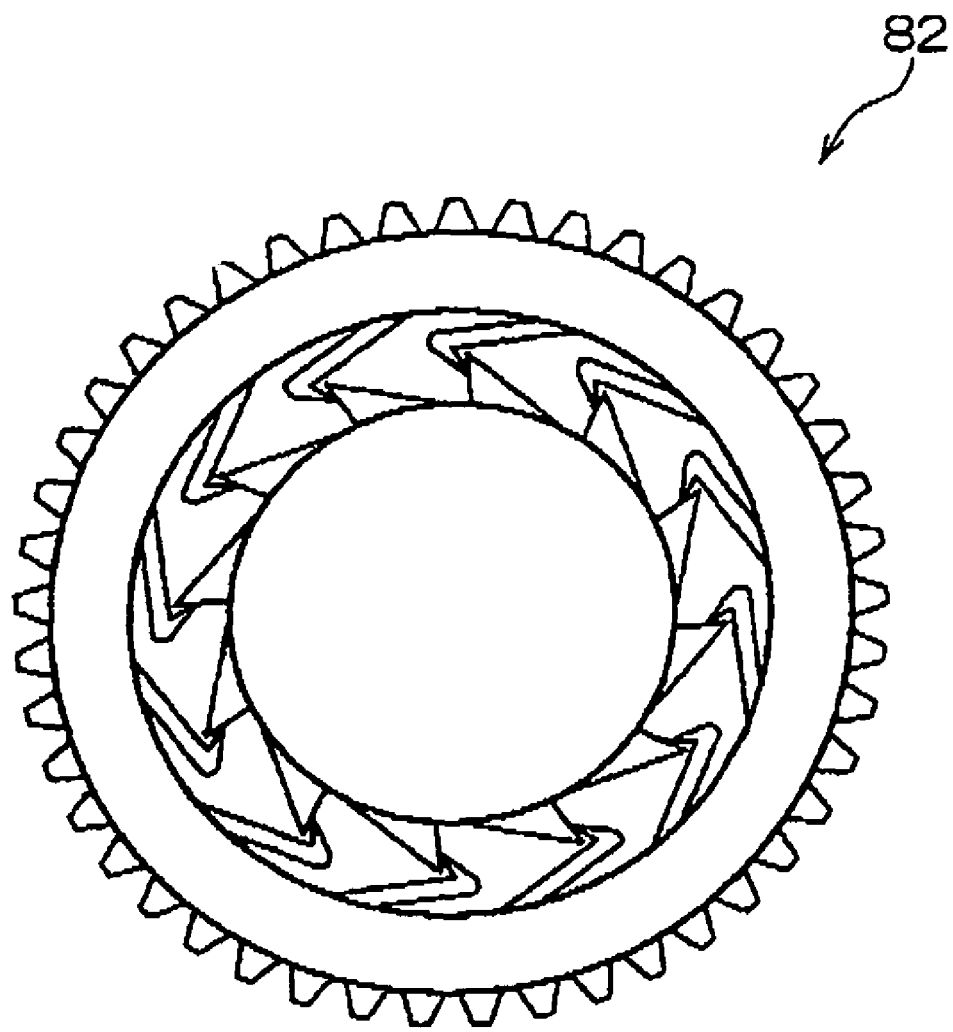
FIG. 7 is a front view showing a constitution of a sealing agent pump drive gear used in the sealing pump up apparatus according to the third embodiment of the invention.

As shown by FIG. 7, the sealing agent pump drive gear 82 is a gear provided with a reverse rotation preventing mechanism by a one way clutch and is constituted to transmit a rotational force to a rotating shaft 83 only when the motor 86 is rotated regularly and not to transmit the rotational force to the rotating shaft 83 by being rotated idly when the motor 86 is rotated reversely. A ratchet may be used for the sealing agent pump drive gear 82.

Also the compressor drive gear 84 is provided with a similar mechanism, a rotational force is transmitted to a rotating shaft 85 only when the motor 86 is rotated reversely, and the rotational force is not transmitted to the rotational force by being rotated idly when the motor 86 is rotated regularly.

In repairing the punctured pneumatic tire 38 by using the pump up apparatus 80, according to the embodiment, the motor 86 is rotated regularly when the sealing agent 36 is injected to the pneumatic tire 38 by driving the sealing agent pump 62 and the motor 86 is rotated reversely when compressed air is injected to the pneumatic tire 38 by driving the compressor 64.

Thereby, a power necessary for rotating the motor 86 becomes significantly lower than that of the second embodiment and considerable power saving can be achieved.

Fourth Embodiment

Figure 9:
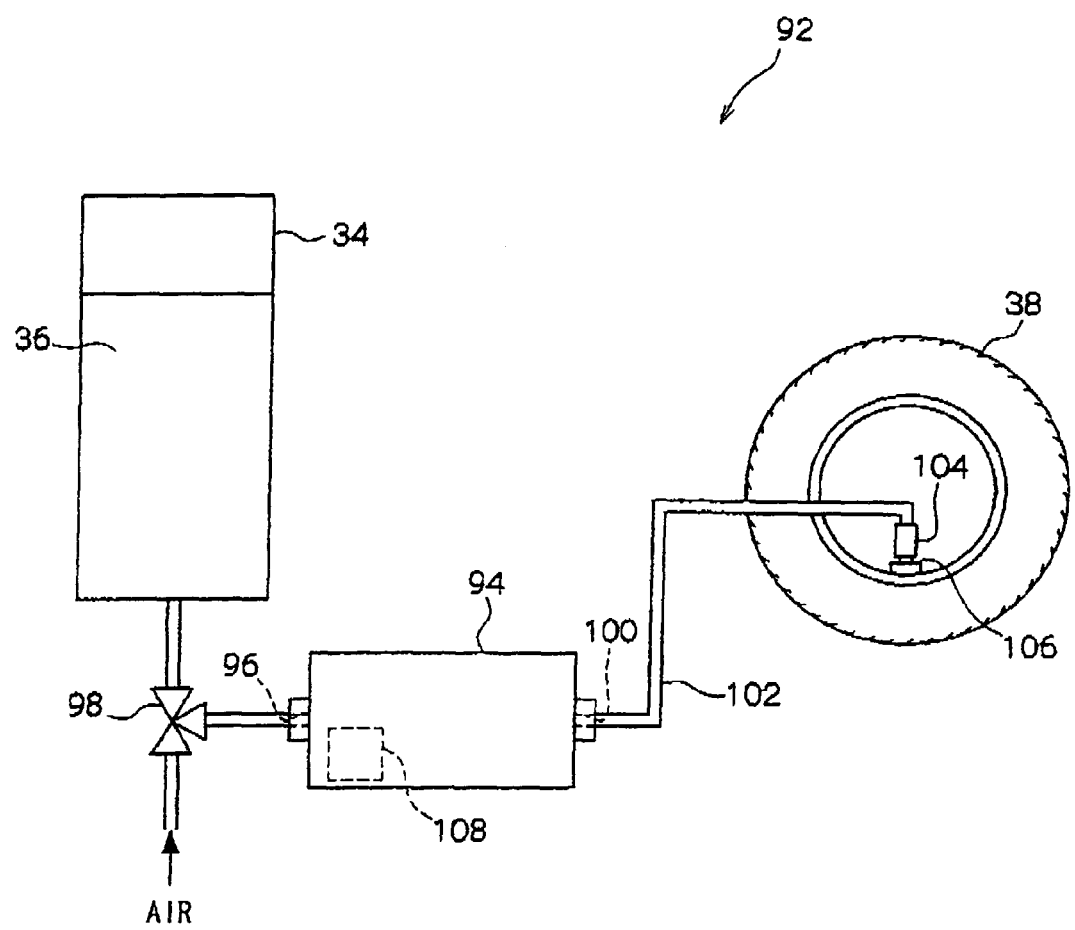
FIG. 9 is a schematic view showing a constitution of a sealing pump up apparatus according to a fourth embodiment of the invention.

Next, a fourth embodiment will be explained. FIG. 9 shows a pump up apparatus according to the fourth embodiment. A pump up apparatus 92 is provided with a common pump 94 and is provided with a three way valve 98 for selectively communicating a suction port 96 of a fluid of the common pump 94 to either one of the sealing agent vessel 34 and outside air by way of pipe. Further, a delivery port 100 of the fluid of the common pump 94 is connected with a base end portion of a pressure resistant hose 102. A front end portion of the pressure resistant hose 102 is provided with a provided adapter 104, and by screwing the adapter 104 to a tire valve 106, the delivery port 100 of the common pump 94 is communicated with inside of the pneumatic tire 38 by way of the pressure resistant hose 102.

Here, the common pump 94 is constituted by a reciprocal type pump for reciprocally moving a piston at inside of a cylinder by constituting a drive source by, for example, a motor 108, sucking any one of the sealing agent 36 and air as a fluid from the suction port 96 and to be able to deliver the sucked fluid from the delivery port 100 by bringing the fluid into a pressurized state.

An explanation will be given of an operational procedure of repairing the punctured pneumatic tire 38 by using the pump up apparatus 92 constituted as described above.

When the pneumatic tire 38 is punctured, first, an operator screws the adapter 104 to the tire valve 106 of the pneumatic tire 38 and connects the pressure resistant hose 102 to the pneumatic tire 38. At this occasion, the suction port 96 of the common pump 94 is connected to the sealing agent vessel 34 by the three way valve 98.

Next, by driving the common pump 94, the sealing agent 36 is sucked from the sealing agent vessel 34 by the common pump 94, and the sealing agent 36 is injected into the pneumatic tire 38 by way of the pressure resistant hose 102. After injecting a predetermined amount of the sealing agent 36 into the pneumatic tire 38, by communicating the suction port 96 of the common pump 94 to outside space by switching the three way valve 98, the suction port 96 of the common pump 94 is supplied with air in place of the sealing agent 36. Under the state, the common pump 94 feeds compressed air to the pneumatic tire 38 to elevate the inner pressure of the pneumatic tire 38 to a rectified pressure.

According to the pump up apparatus 92 of the embodiment, when the suction port 96 of the common pump 94 is connected to the sealing agent vessel 34 by the three way valve 98, the common pump 94 can be used as a sealing agent pump, further, when the suction port 96 of the common pump 94 is connected to outer space by the three way valve 98, the common pump 94 can be used as a compressor and therefore, in addition to an effect achieved by the pump up apparatus 30 according to the first embodiment, a number of parts of the apparatus can be reduced and space saving formation and light-weighted formation can be achieved.

Further, although according to the embodiment, the three way valve 98 is provided to a middle of the pipe between the sealing agent vessel 34 and the common pump 94, such a three way valve may be arranged at inside of the common pump 94. Further, although operation of switching the three way valve 98 which is carried out after finishing to inject the sealing agent 36 may be carried out by manual operation by a determination of a user, the three way valve 98 may automatically be switched by a control of a timer type for automatically switching the three way valve after an elapse of a time period previously set to a timer, or by a sequential control of measuring a flow rate of the sealing agent 36 by a flow rate meter of a digital type provided at inside of the common pump 94 and switching the three way valve at a time point at which a measured value of the flow rate reaches a proper amount of injecting the sealing agent.

Fifth Embodiment

Figure 11:
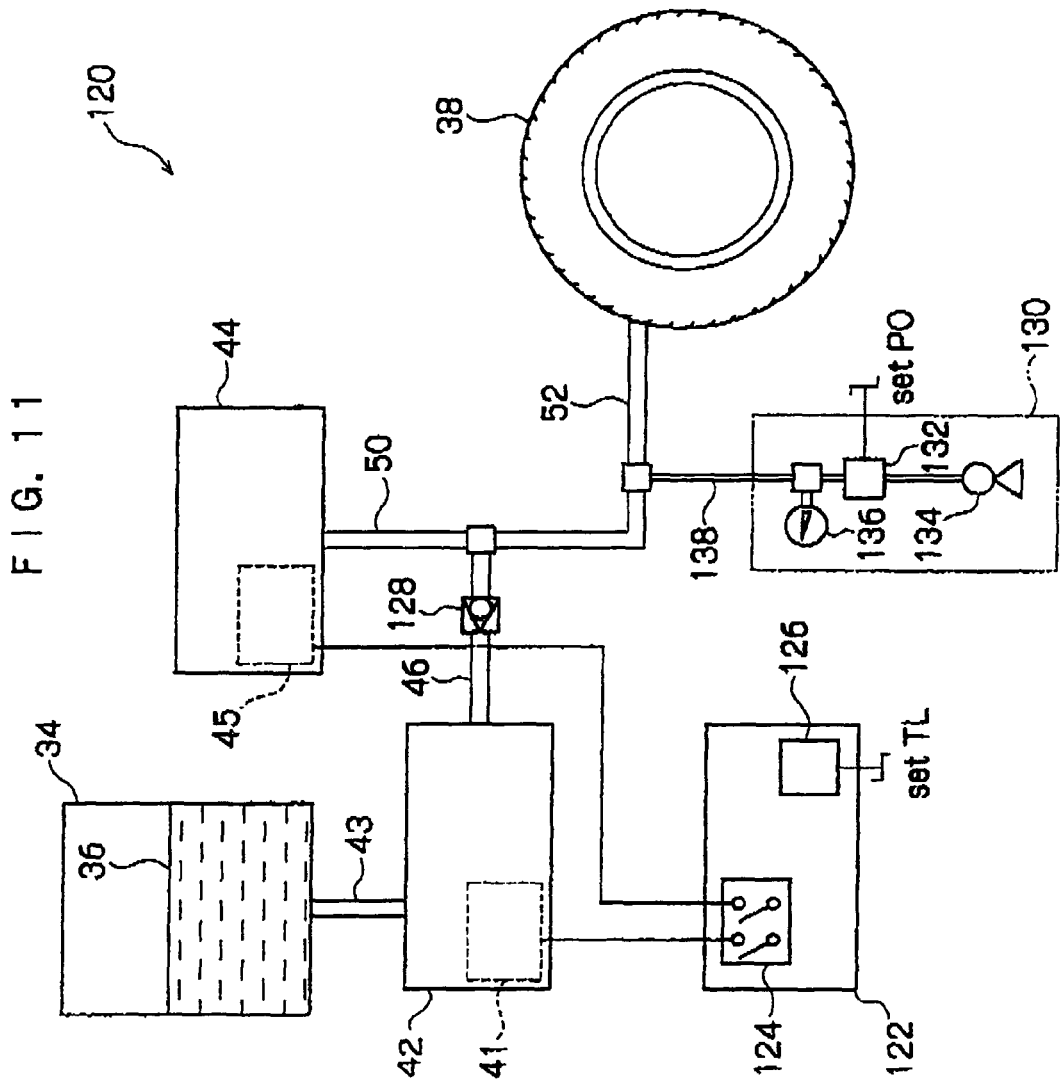
FIG. 11 is a conceptual view showing a constitution of a sealing pump up apparatus according to a fifth embodiment of the invention.

Next, a fifth embodiment will be explained. FIG. 11 shows a pump up apparatus according to a fifth embodiment. In the pump up apparatus 120, portions the same as those of pump apparatus 30 according to the first embodiment are attached with the same notations and an explanation thereof will be omitted. The pump up apparatus 120 is provided with a drive control unit 122 for respectively controlling the compressor 44 and the sealing agent pump 42. The drive control unit 122 is provided with a power source circuit 124 for controlling to supply power source to the compressor 44 and the sealing agent pump 42 and a timer 126 previously set with a time up time TL and by the timer 126; the time up time TL can be changed to an arbitrary time length by setting operation from outside. Here, the timer 126 is previously set with the time up time TL in accordance with an amount of injecting the sealing agent 36 into the pneumatic tire 38.

The pump up apparatus 120 is provided with a check valve 128 at a middle portion of the sealing agent pump 42 and the common pipe 52 in the sealing agent supplying pipe 46, the check valve 128 permits the sealing agent 36 to flow only to a side of the common pipe 52 from a side of the sealing agent pump 42 by passing inside of the sealing agent supplying pipe 46 and hampers the sealing agent 36 and air from flowing to the side of the sealing pump 42 from the side of the common pipe 52 by passing inside of the sealing agent supplying pipe 46 (back flow). Further, the pump up apparatus 120 is connected with an inner pressure control unit 130 by way of a branch pipe 138 at a middle of the common pipe 52.

The inner pressure control unit 130 is provided with a relief valve 132 and an alarmer 134 connected in series by way of the branch pipe 138, and connected with a pressure meter 136 at a middle of the branch pipe 138. When a pressure of air supplied by way of the branch pipe 138 reaches a previously set open pressure PO, an open state is brought about and the relief valve 132 exhausts air (compressed air) to outside of the apparatus by way of the alarmer 134. The open pressure PO of the relief valve 132 can be changed to an arbitrary pressure by setting operation from outside. Here, the relief valve 132 is previously set with the open pressure PO substantially coinciding with a designated pressure previously determined by a maker or the like for each of the pneumatic tire 38 in accordance with a kind, a size or the like of the pneumatic tire 38.

When compressed air is supplied by the relief valve 132, the alarmer 134 emits alarm sound to outside of the apparatus by utilizing an air pressure thereof. Further, the pressure meter 136 displays a pressure of air flowing at inside of the branch 138 (air pressure) to outside of the apparatus.

An explanation will be given of an operational procedure of repairing the punctured pneumatic tire 38 by using the pump up apparatus 120 according to the embodiment as follows.

When the pneumatic tire 38 is punctured, first, the operator screws the adapter to the tire valve (not illustrated) of the pneumatic tire 38 and connects the common pipe 52 to the pneumatic tire.

Next, the operator brings a power source switch (not illustrated) of the drive control unit 122 into an ON state. Thereby, in the pump apparatus 120, the sealing agent pump 42 is driven, the timer 126 of the drive control unit 122 starts operating to measure a time period of injecting the sealing agent 36. When the injection time period measured by the timer 126 coincides with the time up time TL, in synchronism therewith, the drive control unit 122 stops the sealing agent pump 42 and starts operating the compressor 44. Thereby, compressed air produced by the compressor 44 is started to supply into the pneumatic tire 38 by way of the air supplying pipe 50, the common pipe 52, thereafter inner pressures of the pneumatic tire 38, the air supplying pipe 50, the common pipe 52 and the branch pipe 138 are gradually elevated.

When the inner pressure at inside of the branch pipe 138 reaches the open pressure PO, the open state is brought about and the relief valve 132 of the inner pressure control unit 130 exhausts compressed air to outside of the apparatus by way of the alarmer 134. Thereby, air pressures at inside of the pneumatic tire 38, the air supplying pipe 50, the common pipe 52 and the branch pipe 138 are maintained at the open pressure PO. At this occasion, since the open pressure PO is set to the designated pressure of the pneumatic tire 38, the inner pressure of the pneumatic tire 38 is maintained at the designated pressure. Further, the alarmer 134 supplied with compressed air from the relief valve 132 emits alarm sound. The operator can easily recognize that the inner pressure of the pneumatic tire 38 reaches the designated pressure by the alarm sound without continuing to look at the pressure meter 136.

After confirming the alarm sound, the operator brings the power source switch of the drive control unit 122 to an OFF state to stop the compressor 44, detaches the adapter from the tire valve, and separates the common pipe 52 from the pneumatic tire 38.

Further, although according to the pump up apparatus 120 of the embodiment, there is used a so-to-speak mechanical type in which the relief valve 132 as an included valve member is driven from a closed position to an open position by the air pressure reaching the open pressure PO, there may be used an electrical or electronic type of the relief valve which includes, for example, a pressure switch capable of setting the open pressure PO and in which it is detected by the pressure switch that the air pressure reaches the open pressure PO, and the valve member is driven from the closed position to the open position by using an electric element of an electromagnet or the like or an electronic element. Further, although according to the pump up apparatus 120, there is used the alarmer 134 for informing the operator that inner pressure of the pneumatic tire 38 becomes the designated pressure vocally by the alarm sound, in place of the alarmer 134, there may be used a device for informing the operator that the designated pressured is reached visually by flickering a lamp or the like, or there may naturally be used a device simultaneously informing vocally and informing visually that the designated pressure is reached.

Sixth Embodiment

Figure 12:
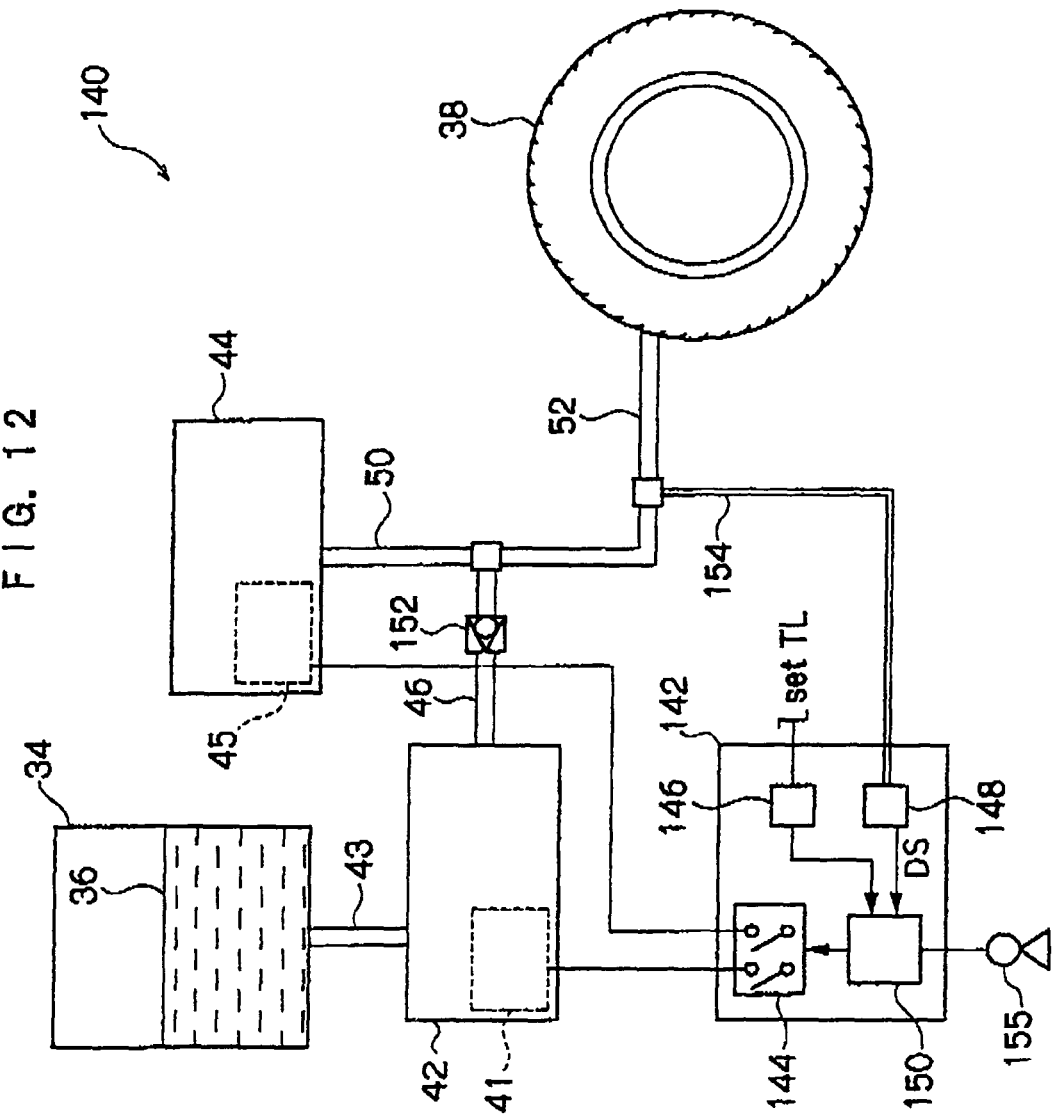
FIG. 12 is a conceptual view showing a constitution of a sealing pump up apparatus according to a sixth embodiment of the invention.

Next, a sixth embodiment will be explained. FIG. 12 shows a pump up apparatus according to the sixth embodiment. In a pump up apparatus 140, portions common to those of the pump up apparatus 30 according to the first embodiment are attached with the same notations and an explanation thereof will be omitted.

The pump up apparatus 140 is provided with a control unit 142 for respectively controlling the compressor 44 and the sealing agent pump 42. The control unit 142 includes a power source circuit 144 for controlling to supply a power source to the compressor 44 and the sealing agent pump 42, a timer 146 previously set with the time up time period TL, a pressure sensor 148 for detecting an air pressure, and a stop control circuit 150 for controlling to stop operating the compressor 44. Further, in a case of a vehicle including an inner pressure alarming apparatus (TPMS) of the tire 38, the exclusive pressure sensor 148 may be omitted and a pressure detecting signal from TPMS may be inputted to the stop control circuit 150 by way of a receiving circuit.

Here, according to the timer 146, the time up time period TL is made to be able to be changed to an arbitrary time length by setting operation from outside, the timer 146 is previously set with the time up time period TL in accordance with an amount of injecting the sealing agent 36 into the pneumatic tire 38.

The pump up apparatus 140 is provided with a check valve 152 at a middle portion of the sealing agent supplying pipe 46 between the sealing agent pump 42 and the common pipe 52, the check valve 152 permits the sealing agent 36 to flow from the side of the sealing agent pump 42 to the side of the common pipe 52 by way of the sealing agent supplying pipe 46 and hampers the sealing agent 36 and air from flowing to the side of the sealing agent pump 42 from the side of the common pipe 52 by passing inside of the sealing agent supplying pipe 46 (back flow). Further, according to the pump up apparatus 120, one end of a branch pipe 154 is connected to a middle of the common pipe 52, and other end of the branch pipe 154 is connected to the pressure sensor 148 of the control unit 142. Thereby, the pressure sensor 148 is supplied with air (compressed air) pressurized into the common pipe 52 by way of the branch pipe 154.

The pressure sensor 148 detects a pressure (air pressure) of compressed air supplied by way of the branch pipe 154 and outputs a detecting signal DS in correspondence with a detected value of the air pressure to the stop control circuit 150. Further, the stop control circuit 150 is connected with an alarmer 155 comprising a buzzer or the like, and the alarmer 155 emits alarm sound to outside of the apparatus when a drive signal outputted from the stop control circuit 150 is received thereby.

Figure 13:
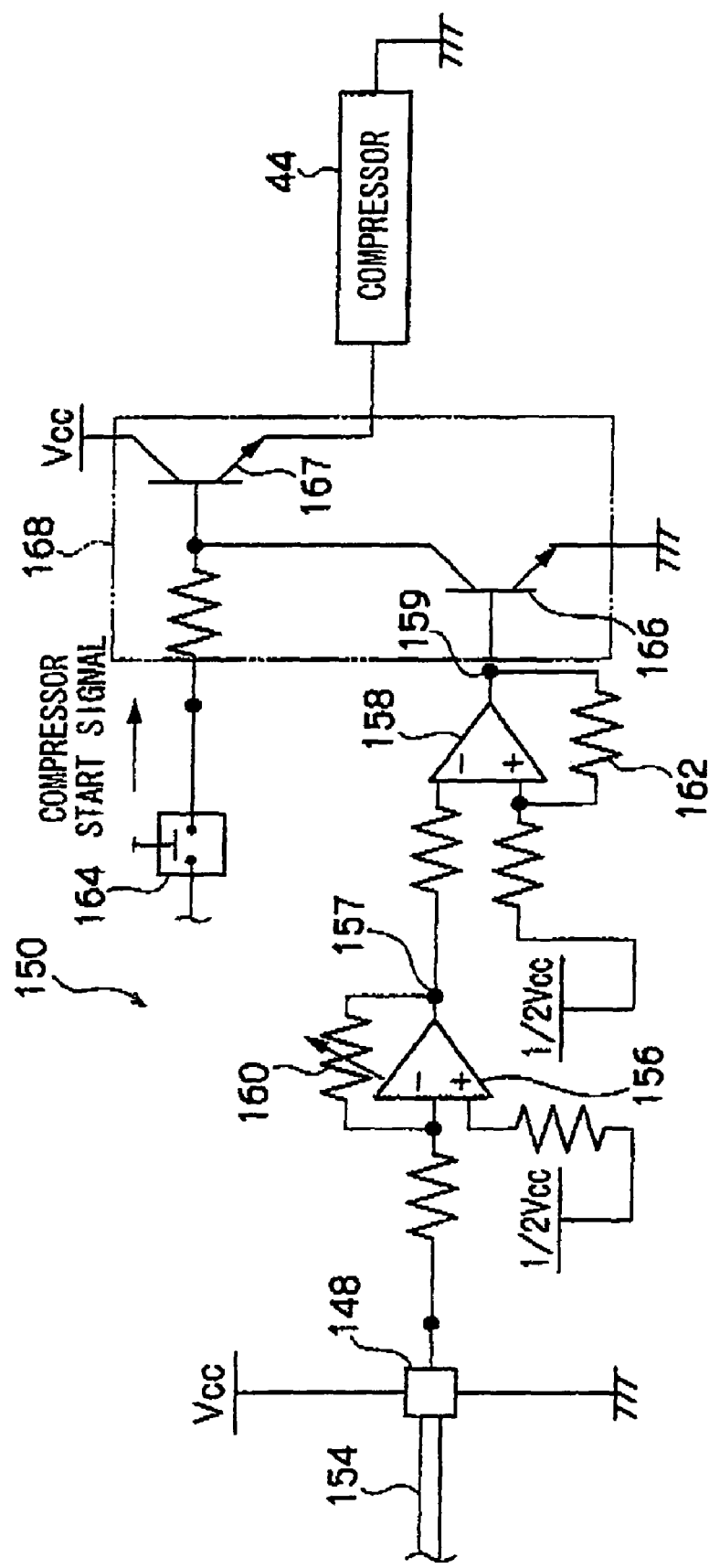
FIG. 13 is a circuit diagram showing a constitution of a stop control circuit in the sealing pump up apparatus according to the sixth embodiment of the invention.

FIG. 13 shows a constitution of a circuit (equivalent circuit) of the stop control circuit 150. The stop control circuit 150 includes an inverted comparator 156 and a hysteresis comparator 158 connected in series with an output terminal 149 of the detecting signal DS of the pressure sensor 148.

Figure 14C:
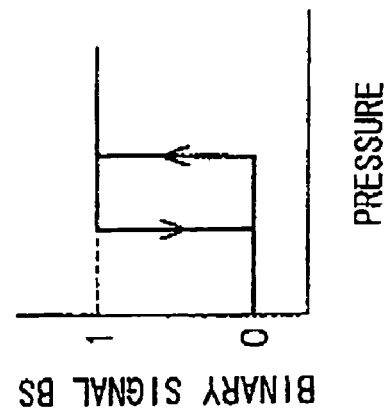
FIG. 14C is a graph showing a relationship between the air pressure supplied to the pressure sensor and a binalized signal of a hysteresis comparator according to the sixth embodiment.
Figure 14B:
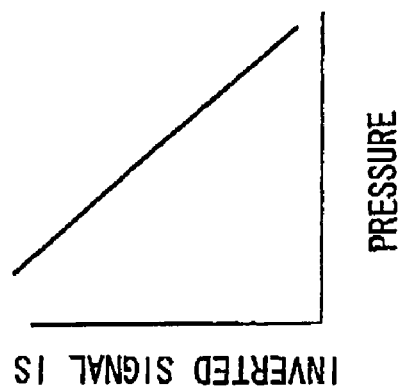
FIG. 14B is a graph showing a relationship between the air pressure supplied to the pressure sensor and an inverted signal of an inverted comparator according to the sixth embodiment.
Figure 14A:
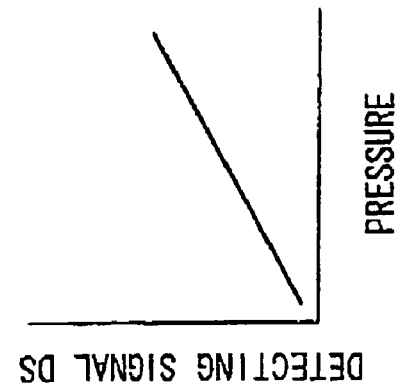
FIG. 14A is a graph showing a relationship between an air pressure supplied to a pressure sensor and a detecting signal of a pressure sensor according to the sixth embodiment.
Figure 17:
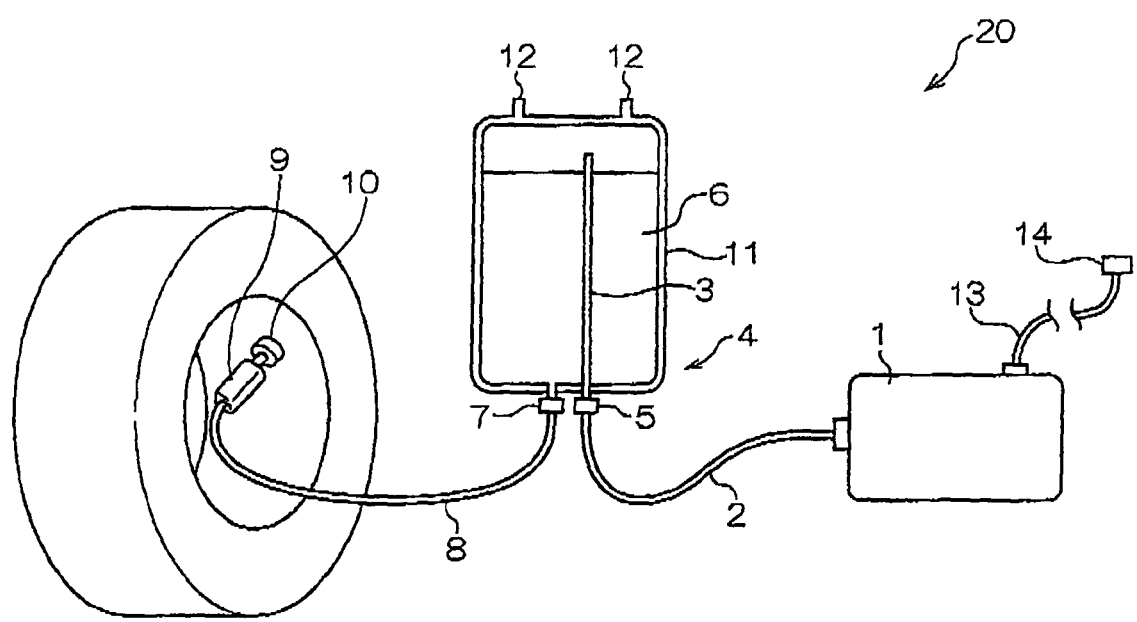
FIG. 17 is a constitution view showing an example of a sealing pump up apparatus of a conventional art.

FIG. 14A shows a relationship between the air pressure supplied to the pressure sensor 148 and an output value of the detecting signal DS, FIG. 14B shows a relationship between the air pressure supplied to the pressure sensor 148 and an inverted signal IS outputted from an output terminal 157 of the inverted comparator 156, FIG. 14C shows a relationship between the air pressure supplied to the pressure sensor 148 and a binalized signal BS outputted from an output terminal 159 of the hysteresis comparator 158, respectively.

The invert comparator 156 converts the detecting signal DS into the inverted signal IS shown in FIG. 14B by inverting and amplifying the detecting signal DS outputted from the pressure sensor 148 and outputs the inverted signal IS to the hysteresis comparator 158.

At this occasion, an amplification factor of the inverted signal IS with respect to the detecting signal DS can be increased or reduced by adjusting a resistance value of a variable resistor 160 connected in parallel with the inverted comparator 156. The amplification factor by the inverted comparator 156 can be set to a value in correspondence with a designated pressure determined by a maker or the like for each of the pneumatic tire 38 in accordance with a kind, a size or the like of the pneumatic tire 38.

The hysteresis comparator 158 converts the detecting signal DS into a binalized signal BS as shown by FIG. 14C by inverting and amplifying the inverted signal IS outputted from the inverted comparator 156 and outputs the binalized signal BS to a switching element 168 comprising a plurality of transistors 166, 167 and the like. The switching element 168 supplies a drive current to the compressor 44 when a signal value of the binalized signal BS is "0" and stops supplying the drive current to the compressor 44 when the signal value of the binalized signal BS is "1".

At this occasion, a threshold in changing the signal value of the binalized signal BS can be set by properly selecting a resistance value of a resistor 162 connected in parallel with the hysteresis comparator 158. Therefore, by setting the amplification factor relative to the detecting signal DS by the inverted comparator 156 to a value in accordance with the designated pressure of the pneumatic tire 38, the signal value of the binalized value BS can be changed from "1" to "0" by a timing at which the air pressure detected by the pressure sensor 148 reaches the designated pressure. Further, when the threshold of the hysteresis comparator 158 is properly set in accordance with large or small of a noise component superposed on the detecting signal DS, the compressor 44 can be prevented from being operated erroneously by an influence of the noise component.

The alarmer 155 is connected to the output terminal 159 of the hysteresis comparator 158, when the signal value of the binalized signal BS outputted from the hysteresis comparator 158 becomes "1" from "0", the alarmer 155 emits alarm sound in synchronism therewith, further, when the signal value of the binalized signal BS becomes "0" from "1", the alarmer 155 stops emitting alarm sound in synchronism therewith.

An explanation will be given of an operational procedure of repairing the punctured pneumatic tire 38 by using the pump up apparatus 140 according to the embodiment as follows.

When the pneumatic tire 38 is punctured, first, an operator screws the adapter to the tire valve (not illustrated) of the pneumatic tire 38 and connects the common pipe 52 to the pneumatic tire.

Next, the operator brings a power source switch 164 of the control unit 142 into an ON state. Thereby, in the pump up apparatus 140, the sealing agent pump 42 is driven and the timer 146 of the control unit 142 starts operating and measures a time period of injecting the sealing agent 36. When the injection time period measured by the timer 146 coincides with the time up time period TL, in synchronism therewith, the control unit 142 stops the sealing agent pump 42 and starts operating the compressor 44. Thereby, compressed air produced by the compressor 44 is started to supply into the pneumatic tire 38 by way of the air supplying pipe 50, the common pipe 52, thereafter, inner pressures of the pneumatic tire 38, the air supplying pipe 50, the common pipe 52 and the branch pipe 138 are gradually elevated.

When the air pressure detected by the pressure sensor 148 reaches the designated pressure, the stop control circuit 150 stops supplying power source to the compressor 44 in synchronism therewith and operates the alarmer 155 to emit alarm sound. Thereby, the compressor 44 can automatically be stopped by a timing at which the pressure of the pneumatic tire 38 is elevated to the designated pressure and the operator or the like can be informed of the fact that the inner pressure of the pneumatic tire 38 is elevated to the designated pressure by the alarm sound. The operator confirms the alarm sound, thereafter, detaches the adapter from the tire valve, and detaches the common pipe 52 from the pneumatic tire 38.

Further, although according to the pump up apparatus 140 of the embodiment, there is used the alarmer 155 for informing the operator of the fact that the inner pressure of the pneumatic tire 38 becomes the designated pressure vocally by the alarm sound, in place of the alarmer 155, there may be used a device for informing the operator of the fact that the designated pressure is reached visually by flickering a lamp or the like, or there may naturally be used a device simultaneously informing the fact vocally and informing the fact visually.

Seventh Embodiment

Next, a seventh embodiment will be explained. FIG. 15 and FIG. 16 show a pump up apparatus according to the seventh embodiment of the invention. A pump up apparatus 210 injects a sealing agent 234 into a punctured tire, thereafter, pressurizes an inner pressure of the tire to a predetermined reference pressure again.

As shown by FIG. 1, the pump up apparatus 210 includes a casing 212 in a box-like shape as an outer shell portion thereof, and the casing 212 is constituted by a two-divided structure which can be divided into a main body casing 214 and an attachable/detachable casing 216 along a height direction (arrow mark H direction) of the apparatus. The main body casing 214 is formed by a shape of a cabinet a dimension along a width direction (arrow mark W direction) of which is more or less longer than a dimension in the height direction as a whole, further, the attachable/detachable casing 216 is formed by a shape of a flat plate along the height direction as a whole.

Inside of the main body casing 214 is mounted with an air compressor 218 constituting a supply source of compressed air, a compressor motor 220 connected to be able to transmit a torque to the air compressor 218, a sealing agent vessel 232 containing the sealing agent 234, a pump motor 236 connected to be able to transmit a torque to a sealing agent pump 240, mentioned later, a control unit 222 for controlling the compressor motor 220 and the like and a power source switch 224. The power source switch 224 includes a switch lever (not illustrated) projected to an outer side of the main body casing 214 to be able to hold the switch lever to either position of "OFF position" and "ON position". Here, there is used the air compressor 218 of, for example, a reciprocal type for sucking and exhausting air by reciprocating a piston at inside of a cylinder. Further, the control unit 222 includes an inner timer (not illustrated) and the inner timer is set with the injection time period TL in correspondence with an amount of injecting the sealing agent 234 into a tire determined in accordance with a kind, a size or the like of the tire.

The power source switch 224 outputs a contact signal as a drive instruction to the control unit 222 in a state in which the switch lever is disposed at "ON position" and stops outputting the contact signal to the control unit 222 in a state in which switch the lever is disposed at "OFF position". Further, the power source switch 224 includes a power source cable 226, and a front end side of the power source cable 226 is extended to outside of the main body casing 214. A front end portion of the power source cable 226 is provided with a connection plug 228 and the connection plug 228 is made to be able to insert and detach to and from a cigar socket provided at a vehicle. By inserting the connection plug 228 into the cigar socket, the power source switch 224 is electrically connected to a battery mounted to the vehicle. When an operator moves the switch lever of the power source switch 224 from "OFF position" to "ON position" under the state, power source from the battery is started to supply to the control unit 222 by way of the power source switch 224.

According to the pump up apparatus 210, the main body casing 214, the air compressor 218 provided at the main body casing 214, the compressor motor 220, the sealing agent vessel 232, the pump motor 236, the compressor motor 220, the control unit 222, the power source switch 224 and the like mounted to the main body casing 214 constitute a main body portion 230 of the apparatus. Further, the sealing agent vessel 232 is attachably and detachably mounted to the main body casing 214 and detached from inside of the main body casing 214 after using the pump up apparatus 210 for repairing puncture of a tire and consuming the sealing agent 234 at inside of the sealing agent vessel 232. Thereafter, the main body casing 214 is attached with the sealing agent vessel 232 containing a predetermined amount of the sealing agent 234. Thereby, the sealing agent 234 can simply be replenished to the pump up apparatus 210 after repairing puncture.

On the other hand, the attachable/detachable casing 216 is mounted with the sealing agent pump 240 for sucking the sealing agent 234 from inside of the sealing agent vessel 232 to be supplied to a tire, a suction pipe 246 for communicating a suction port 242 of the sealing agent pump 240 to inside of the sealing agent vessel 232, and a supply pipe 238 for communicating a delivery port 244 of the sealing agent pump 240 to inside of a tire. The supply pipe 238 is provided with a three way pipe joint 248 at a front end portion thereof, and the three way pipe joint 248 is respectively connected with a joint hose 250 and a branch pipe 252.

A front end side of the joint hose 250 is extended to outside of the attachable/detachable casing 216, and a front end portion of the joint hose 250 is provided with a valve adapter 251 attachably and detachably connected to a tire valve of a tire by screwing. Further, the supply pipe 238 is provided with a check valve 254 between the sealing agent pump 240 and the three way pipe joint 248, and the check valve 254 permits a fluid (sealing agent 234) from a side of the sealing agent pump 240 to a side of the joint hose 250 by passing the supply pipe 238 and hampers a fluid (sealing agent 234 and compressed air) from flowing from the side of the joint hose 250 to the side of the sealing agent pump 240.

Here, as the sealing agent pump 240, for example, various pumps of a gear pump, a screw pump, a vane pump, a reciprocal pump and the like can be used. According to the pump up apparatus 210, the attachable/detachable casing 216 and the sealing agent pump 240, a suction pipe 246, the supply pipe 238 and the like mounted to the attachable/detachable casing 216 constitute an attachable/detachable unit 256 in the apparatus, and the attachable/detachable unit 256 is made to be attachable/detachable to and from the main body portion 230.

As shown by FIG. 16, in the main body casing 214 is formed with a fixing hinge portion 258 having a cross section substantially in an U shape on one end side of a lower end portion thereof, and the main body casing 214 is provided with a joint lever 262 on other end side thereof. A lower end side of the fixing hinge portion 258 is projected from a lower face of the main body casing 214 to a side of the attachable/detachable unit 256, and a lower end portion of the fixing hinge portion 258 is integrally formed with an inserting/detaching port 260 opened to an inner side in a width direction.

A lower end side (front end side) of the joint lever 262 is also projected from the lower face of the main body casing 214 to the side of the attachable/detachable unit 256, and a base end portion of the joint lever 262 is pivotably connected to a lower end portion of the main body casing 214 by way of a connecting pin 264. The joint lever 262 is made to be pivotable between a connecting position indicated by a bold line of FIG. 15 and a releasing position indicated by a two-dotted chain line. A front end portion of the joint lever 262 is bored with a screw hole 266 along a thickness direction thereof, and a fixing screw 68 is screwed into the screw hole 262 from an outer side in the width direction of the apparatus. Further, the joint lever 262 is formed with an engaging recess portion 270 on a base end side of the screw hole 266 on an inner side face thereof.

On the other hand, the attachable/detachable casing 216 is formed with an attachable/detachable hinge portion 272 in a projected shape in correspondence with the fixing hinge portion 258 on one end side along the width direction of an upper end portion thereof, and formed with an engaging projection 274 and a screw hole 276 respectively in correspondence with the engaging recess portion 270 and the fixing screw 68 of the joint lever 262 on other end side thereof. The attachable/detachable hinge portion 272 is made to be able to insert and detach to and from inside of the fixing hinge portion 258 by way of the inserting/detaching port 260. As shown by FIG. 15, when the attaching/detaching hinge portion 272 is inserted into the fixing hinge portion 258, the one end side of the attachable/detachable casing 216 is connected to the main body casing 214 by way of the attachable/detachable hinge portion 272 and the fixing hinge portion 258. At this occasion, the attachable/detachable casing 216 is made to be swingable within a range between a mounting position indicated by the bold line and an inserting/detaching position indicated by the two-dotted chain line centering on the attachable/detachable hinge portion 272 and the fixing hinge portion 258.

According to the attachable/detachable casing 216 disposed at the mounting position, a top face portion thereof is brought into contact with a bottom face portion of the main body casing 214, further, according to the attachable/detachable casing 216 disposed at the inserting/detaching position, the top face portion is separated from the bottom face portion of the main body casing 214 in an inclined state, by moving the attachable/detachable casing 216 to the other end side along the width direction of the apparatus under the state, the attachable/detachable hinge portion 272 is detached from inside of the fixing hinge portion 258 to separate the attachable/detachable casing 216 from the main body casing 214.

Further, when the joint lever 262 is pivoted to a connecting position from a side of a releasing position in a state in which the attachable/detachable casing 216 is disposed at the mounting position, the engaging projection 274 is inserted into the engaging recess portion 270 of the joint lever 262. Thereby, the attachable/detachable casing 216 is hampered from being pivoted from the mounting position to the side of the inserting/detaching position. At this occasion, the front end portion of the fixing screw 68 coincides with the screw hole 276, and the front end side of the fixing screw 68 can be screwed into the screw hole 276. By screwing the fixing screw 68 into the screw hole 276 until a head portion thereof is brought into press contact with the joint lever 262 under the state, the joint lever 262 is fastened to be fixed at the connecting position. Thereby, the attachable/detachable casing 216 is constrained to the mounting position to be integrated with the main body casing 214.

As shown by FIG. 16, in the sealing agent vessel 232, is formed with a head portion 278 substantially in a cylindrical shape a sectional area of which is reduced to other end side thereof at one end portion on a side of the attachable/detachable casing. A delivery port 280 of the sealing agent 234 is opened at a front end face of the head portion 278, and the delivery port 280 is sealed by a seal member 282 of an aluminum foil or the like. Further, the air compressor 218 is provided with a plug portion 284 substantially in a cylindrical shape at one end portion of the attachable/detachable casing 216. A path of supplying compressed air is penetrated through inside of the plug portion 284, and a front end of the supply path is opened at a front end face of the plug portion 284. Here, the main body casing 214 supports the sealing agent vessel 232 and the air compressor 218 to respectively project the head portion 278 and the plug portion 284 to the side of the attachable/detachable casing 216 from the bottom face side.

Further, the pump motor 236 is provided with a torque transmitting shaft 288 projected from an end portion thereof on a side of the attachable/detachable casing 216, a front end portion of the torque transmitting shaft 288 is formed with a taper portion 289 a width of which is gradually narrowed along a predetermined diameter direction, and formed with a connecting piece 290 in a shape of a flat plate projected from a front end of the taper portion 289. Here, the main body casing 214 supports the pump motor 236 such that the torque transmitting shaft 288 is projected to the side of the attachable/detachable casing 216 from the bottom face portion.

On the other hand, the attachable/detachable casing 216 is provided with a connection cap 292 at a portion thereof in correspondence with the head portion 278 of the sealing agent vessel 232. The connection cap 292 is supported by the attachable/detachable casing 216 to open to the side of the main body casing 214, and inside thereof is formed with a fitting and inserting hole 294 to and from which the head portion 278 of the sealing agent vessel 232 is made to be able to insert and detach. The connection cap 292 is provided with an O ring (not illustrated) for sealing a liquid comprising rubber or the like on an outer peripheral side of a bottom face portion of the fitting and inserting hole 294, and is provided with a breakthrough pipe 296 in a hollow shape to project from a center of a bottom face portion of the fitting and inserting hole 294 to a side of the attachable/detachable casing 216. A base end portion of the breakthrough pipe 296 is connected with a base end portion of the suction pipe 246, the breakthrough pipe 296 is communicated with the suction port 242 of the sealing agent pump 240 by way of the suction pipe 246.

According to the pump up apparatus 210, when the attachable/detachable casing 216 disposed at an inserting and detaching position is pivoted to a mounting position, in corporation therewith, the head portion 278 of the sealing agent vessel 232 is fitted and inserted into the fitting and inserting hole 294 of the connection cap 292, and the breakthrough pipe 296 is projected to break the seal member 282 to be inserted into the sealing agent vessel 232. Thereby, a clearance between the delivery port 280 of the head portion 278 and the breakthrough pipe 296 of the connection cap 292 is sealed to constitute a liquid tight state by the O ring, and an inner space of the sealing agent vessel 232 is communicated with the suction port 242 of the sealing agent pump 240 by passing the breakthrough 296 and the suction pipe 246.

Further, according to the pump up apparatus 210, when the attachable/detachable casing 216 disposed at the mounting position is pivoted to an inserting and detaching position, in cooperation therewith, simultaneously with detaching the head portion 278 of the sealing agent vessel 232 from inside of the fitting and inserting hole 294 of the connection cap 292, the breakthrough pipe 296 is drawn from inside of the sealing agent vessel 232. Thereby, the suction port 242 of the sealing agent pump 240 is separated from the sealing agent vessel 232.

The attachable/detachable casing 216 is provided with a socket portion 298 in a cap-like shape at a portion thereof in correspondence with the plug portion 284 of the air compressor 218. The socket portion 298 is supported by the attachable/detachable casing 216 to open to the side of the main body casing 214, and inside thereof is formed with a fitting and inserting hole 300 to and from which the plug portion 284 of the air compressor 218 is made to be able to insert and detach. The socket portion 298 is arranged an O ring (not illustrated) for sealing a gas comprising rubber or the like on an outer peripheral side of a bottom face portion of the fitting and inserting hole 300, and a communicating port communicated with inside of the branch pipe 252 is opened at a center portion of a bottom face portion thereof.

According to the pump up apparatus 210, when the attachable/detachable casing 216 disposed at the inserting and detaching position is pivoted to the mounting position, in cooperation therewith, the plug portion 284 of the air compressor 218 is fitted and inserted into the fitting and inserting hole 300 of the socket portion of the socket portion 298. Thereby, a clearance between the plug portion 284 and the socket portion 298 is sealed to constitute an airtight state by the O ring, a supply path 286 of the plug portion 284 is communicated with inside of the branch pipe 252 by way of the socket portion 298, and an air delivery port (not illustrated) of the air compressor 218 is communicated with the joint hose 250 by passing the supply path 286, the branch pipe 252, the three way pipe joint 248. Further, according to the pump up apparatus 210, when the attachable/detachable casing 216 disposed at the mounting position is pivoted to an inserting/detaching position, in cooperation therewith, the plug portion 284 of the air compressor 218 is detached from inside of the fitting and inserting hole 300 of the socket portion 298, and the air compressor 218 is separated from the branch pipe 252.

As shown by FIG. 16, the sealing agent pump 240 is provided with a torque transmitting member 304 at a portion thereof in correspondence with the torque transmitting shaft 288 of the pump motor 236. The torque transmitting member 304 is formed with a connection hole 306 to and from which the torque transmitting shaft 288 is made to be able to insert and detach, and inside of the connection hole 306 is formed with a taper receive portion 308 and a connecting groove 310 respectively in correspondence with the taper portion 289 and the connecting piece 290. Here, the sealing agent pump 240 is operated in rotating the torque transmitting member 304 to be operated to suck/deliver the sealing agent 234.

According to the pump up apparatus 210, when the attachable/detachable casing 216 disposed at the inserting/detaching position is pivoted to the mounting position, in cooperation therewith, the torque transmitting shaft 288 of the pump motor 236 is inserted into the connection hole 306 of the sealing agent pump 240. At this occasion, the connecting piece 290 of the torque transmitting shaft 288 is guided to inside of the connecting groove 310 at inside of the connection hole 306 by operation of the taper portion 289 of the torque transmitting shaft 288 and the taper receive portion 308 of the connection hole 306 and the connecting piece 290 is fitted to inside of the connecting groove 310 when the attachable/detachable casing 216 reaches the mounting position. Thereby, the torque transmitting shaft 288 is connected to be able to transmit a torque to the torque transmitting member 304. Further, according to the pump up apparatus 210, when the attachable/detachable casing 216 disposed at the mounting position is pivoted to the inserting/detaching position, in cooperation therewith, the torque transmitting shaft 288 is drawn from inside of the connection hole 306 to separate the pump motor 236 from the sealing agent pump 240.

Operation of Embodiment

Next, an explanation will be given of an operational procedure of repairing a punctured tire by using the pump up apparatus 210 according to the embodiment. Further, the pump up apparatus 210 according to the embodiment is stored in a trunk room or the like of a vehicle in a state of being integrated as the pump up apparatus 210 by mounting the attachable/detachable unit 256 to the main body portion 230 as shown by FIG. 15.

When a tire is punctured, first, an operator connects the valve adapter 251 of the joint hose 250 to the tire valve of the tire, thereafter, moves the switch lever of the power source switch 224 from "OFF position" to "ON position". In synchronism therewith, the control unit 222 starts to supply the drive current to the pump motor 236 to start to drive the pump motor 236 and starts to measure the time period of injecting the sealing agent 234 by the inner timer (not illustrated). The pump motor 236 supplied with the drive current from the control unit 222 transmits a torque from the torque transmitting shaft 288 to the torque transmitting member 304 to operate the sealing agent pump 240. The sealing agent pump 240 brought into an operating state by the torque transmitted from the torque transmitting shaft 288 sucks the sealing agent 234 at inside of the sealing agent vessel 232 by way of the suction pipe 246 and the suction port 242 and brings the sealing agent 234 into a pressurized state to be fed to inside of the supply pipe 238 by passing the delivery port 244. The sealing agent 234 is injected to a tire by passing the supply pipe 238 and the joint hose 250.

The inner timer of the control unit 222 outputs a count up signal when the time period from starting to drive the pump motor 236 coincides with the injection time period TL previously set in accordance with a kind, a size or the like of the tire. In synchronism with an output of the count up signal, the control unit 222 stops supplying the drive current to the pump motor 236 to stop the sealing agent pump 240, thereafter, starts to supply the drive current to the compressor motor 220 to start to operate the air compressor 218. The sealing agent pump 240 sucks the sealing agent 234 from inside of the sealing agent vessel 232 by an amount more or less larger than an amount rectified by the tire during the injection time period TL and injects the sealing agent 234 to a tire.

On the other hand, after an elapse of the injection time period TL, the air compressor 218 brought into an operating state sucks air from outside of the compressor and produces compressed air by compressing air and delivers the compressed air from the air supply port. The compressed air is supplied into the tire by passing the supply path 286 of the plug portion 284, the branch pipe 252, the three way pipe joint 248, the joint hose 250 to expand the tire. Thereafter, the operator returns the power source switch 224 to "OFF position" when it is confirmed that inner pressure of the tire reaches the rectified pressure by a pressure gage. Thereby, the control unit 222 stops the air compressor 218 by stopping to supply the current to the compressor motor 220.

Successively, the operator draws the valve adapter 251 from the tire valve to separate the joint hose 250 and draws the connection plug 228 of the power source cable 226 from the cigar socket of the vehicle. Under the state, temporarily, the operator contains the pump up apparatus 210 to the trunk or the like, thereafter, carries out preliminary running over a constant distance by using a tire injected with the sealing agent 234. After finishing the preliminary running, the operator measures the inner pressure of the tire again, screws the valve adapter 251 to the tire valve and pressurizes the tire to the rectified inner pressure by operating the air compressor 218 of the pump up apparatus 210 as necessary. Thereby, repair (emergency repair) of puncture of the tire is finished and running at a constant speed or less (for example, 80 Km/h or less) can be carried out within a constant distance range.

After finishing emergency repair of the tire as described above, it is necessary for the operator to carry the vehicle to a repair facility of a gas station, a maintenance shop or the like as fast as possible and make the repair facility repair the punctured tire or interchange the tire. Further, with regard to the pump up apparatus 210, it is necessary to interchange the attachable/detachable unit 256 including the suction pipe 246, the suction pump, the supply pipe 238, the joint hose 250 to which the sealing agent 234 flows in subjecting the tire to emergency repair, with new one.

Next, an explanation will be given of a procedure of operation of interchanging the attachable/detachable unit 256 and the sealing agent vessel 232 from the main body portion 230 of the pump up apparatus 210.

First, the operator rotates the fixing screw 68 in the drawing direction to draw from inside of the screw hole 276, pivots the joint lever 262 disposed at the connecting portion to the opening position, thereafter, pivots the attachable/detachable casing 216 (attachable/detachable unit 256) from the mounting position to the inserting and detaching position centering on the fixing hinge portion 258 and the attachable/detachable hinge portion 272. Under the state, the operator moves the attachable/detachable unit 256 in a skewed lower direction to draw the attachable/detachable hinge portion 272 from inside of the fixing hinge portion 258 to separate the attachable/detachable unit 256 from the main body portion 230. Although the attachable/detachable unit 256 separated from the main body portion 230 may be abandoned as a non-inflammable object or the like, it is preferable to redistribute the attachable/detachable unit 256 to the market or the like by recovering the attachable/detachable unit 256 at a repair facility or the like, cleaning to remove the sealing agent 234 remaining at insides of the suction pipe 246, the suction pump, the supply pipe 238, the joint hose 250, and interchanging a consumable part of the O ring or the like by a new one as necessary.

Successively, the operator draws the sealing agent vessel 232 from inside of the main body portion 230 from which the attachable/detachable unit 256 is detached and mounts a new one of the sealing agent vessel 232 which contains a predetermined amount of the sealing agent 234, and the delivery port 280 of which is sealed by the seal member 282 to the main body portion 230 in place of the used sealing agent vessel 232. After finishing to interchange the sealing agent vessel 232, the operator inserts the attachable/detachable hinge portion 272 into the fixed hinge portion 258 while bringing a unused one of the attachable/detachable unit 256 into an inclined state to be substantially in parallel with that in a case of being disposed at the inserting/detaching position relative to the main body portion 230, and the attachable/detachable unit 256 is pivoted from the inserting/detaching position to the mounting position centering on the hinge portions 58, 72. Thereafter, the operator pivots the joint lever 262 disposed at the releasing position and constrains the attachable/detachable unit 256 to the mounting position by the joint lever 262 by screwing the fixing screw 68 into the screw hole 276 while holding the joint lever 262 to the connecting position. Thereby, interchange of the sealing agent vessel 232 and the attachable/detachable unit 256 is finished relative to the main body portion 230.

According to the pump up apparatus 210 of the embodiment of the invention explained above, when the unused attachable/detachable unit 256 is mounted to the main body portion 230 by the above-described procedure, in cooperation with operation of mounting the attachable/detachable unit 256 to the main body portion 230, the head portion 278 of the sealing agent vessel 232 is fitted and inserted into the fitting and inserting hole 294 of the connection cap 292 and the breakthrough pipe 296 of the connection cap 292 breaks the seal member 282. Thereby, the suction port 242 of the sealing agent pump 240 is communicated to inside of the sealing agent vessel 232 by way of the suction pipe 246, and the sealing agent pump 240 can suck the sealing agent 234 from inside of the sealing agent vessel 232.

Further, according to the pump up apparatus 210, in cooperation with operation of mounting the attachable/detachable unit 256 to the main body portion 230, the socket portion 298 of the air compressor 218 is fitted and inserted into the fitting and inserting hole 300 of the plug portion 284 to communicate the supply path at inside of the plug portion 284 with inside of the branch pipe 252 by passing the communication port of the socket portion 298. Thereby, compressed air produced by the air compressor 218 can be supplied into the tire by passing the supply path 286, the branch pipe 252, the three way pipe joint 248 and the joint hose 250.

Further, according to the pump up apparatus 210, in cooperation with operation of mounting the attachable/detachable unit 256 to the main body portion 230, the torque transmitting shaft 288 of the pump motor 236 is connected to be able to transmit a torque to the transmitting member 304, and the torque produced by the pump moor 236 can be transmitted to the sealing agent pump 240 by way of the torque transmitting shaft 288 and the torque transmitting member 304.

Therefore, according to the pump up apparatus 210, by only making the operator carry out the mounting operation of mounting the unused attachable/detachable unit 256 to the main body portion 230 from which the used attachable/detachable unit 256 is detached, the apparatus can be brought into an operable state by integrating unused one of the supply pipe 238, the sealing agent pump 240, the branch pipe 252 and the joint hose 250 respectively as portions of the apparatus.

In contrast thereto, according to the sealing apparatus of the conventional art, unless the sealing agent remaining at insides of constituent parts of the apparatus of a pipe, a suction pump, a joint hose or the like (hereinafter, referred to as "liquid path parts") through which the sealing agent flows after finishing to repair the tire by cleaning or the like or the flow path parts are interchanged by new ones, the flow path parts cannot be used for repairing the tire. Therefore, according to the sealing pump up apparatus of the conventional art, the flow path parts are disassembled from the main body portion piece by piece and the flow path parts are interchanged by new ones (cleaned products or unused products).

According to the pump up apparatus 210 of the embodiment, although when the sealing agent pump 240 is operated by the torque of the pump motor 236, the sealing agent 234 sucked from inside of the sealing agent vessel 232 by the sealing agent pump 240 respectively flows insides of the suction pipe 246, the sealing agent pump 240, the supply pipe 238 and the joint hose 250, since all of the suction pipe 246, sealing agent pump 240 and the joint hose 250 are mounted to the attachable/detachable unit 256, by only mounting a new one of the attachable/detachable unit 256 to the main body portion 230 from which the used attachable/detachable unit 256 is previously detached, that is, by only carrying out operation of mounting the attachable/detachable unit 256 to the main body portion 230 once, the constituent parts of the apparatus including the suction pipe 246, the sealing agent pump 240 and the joint hose 250 can be interchanged by new ones (the new ones can be integrated thereto). As a result, in comparison with a case of integrating the suction pipe 246, the sealing agent pump 240 and the joint hose 250 as well as constituent parts of the apparatus accompanied thereto to the main body portion 230 piece by piece, the constituent parts can simply be integrated and also a time period of integrating the constituent parts to the main body portion 230 can considerably be shortened.

Further, according to the pump up apparatus 210 of the embodiment, when the attachable/detachable unit 256 is separated from the main body portion 230, by separating the suction pipe 246 and the branch pipe 252 respectively from the sealing agent vessel 232 and the air compressor 218 and releasing the state of connecting the sealing agent pump 240 and the pump motor 236 in cooperation with the operation of separating the attachable/detachable unit 256, by only carrying out the separating operation of detaching the attachable/detachable unit 256 from the main body portion 230 after repairing the punctured tire, the used constituent parts of the apparatus including the suction pipe 246, the sealing agent pump 240 and the joint hose 250 can be detached from the main body portion 230 and therefore, in comparison with the case of disassembling the suction pipe 246, the sealing agent pump 240 and the joint hose 250 piece by piece from the main body portion 230, the constituent parts necessary to be interchanged for using the apparatus again can simply be disassembled from the main body portion 230, further, also the time period of disassembling the constituent parts from the main body portion 230 can considerably be shortened.

Further, according to the pump up apparatus 210 of the embodiment, by providing the check valve 254 for preventing the sealing agent 234 and compressed air from flowing back from the side of the tire to the suction pump at the supply pipe 238, when the sealing agent pump 240 or the air compressor is stopped, the sealing agent 234 temporarily injected into the tire can firmly be prevented from flowing back to inside of the sealing agent pump 240 by the inner pressure of the tire and therefore, the sealing agent pump 240 is prevented from being failed by the flowed-back sealing agent 234. Although according to the pump up apparatus 210, when the sealing agent pump 240 is operated, the sealing agent 234 flows also at inside of the check valve 254, since also the check valve 254 is mounted to the attachable/detachable unit 256 as a portion of the supply pipe 238, by interchanging the attachable/detachable unit 256, also the check valve 254 can simply be interchanged from the main body portion 230.

Further, although according to the pump up apparatus 210 of the embodiment, there is a possibility that the sealing agent 234 flowed back from the side of the tire by passing the joint hose 250 flows also to inside of the branch pipe 252, since the air compressor 218 of the reciprocal type is used, the sealing agent 234 can be hampered from invading inside of the cylinder of the air compressor 218 by an exhaust valve (not illustrated) arranged at an air delivery port of the air compressor 218. Further, the check valve 254 may be omitted, but a three way check valve may be arranged in place of the three way pipe joint 248 between the supply pipe 238 and the joint hose 250, and the sealing agent 234 and the compressed air may be prevented from flowing back from inside of the joint hose 250 to insides of the supply pipe 238 and the branch pipe 252 by the three way check valve.

Further, although according to the pump up apparatus 210 of the embodiment, two pieces of the compressor motor 220 and the pump motor 236 are provided at inside of the main body portion 230, the torques are transmitted to the air compressor 218 and the sealing agent pump 240 by the motors 20, 36 independently from each other, and the air compressor 218 and the sealing agent pump 240 are operated at timings different from each other, a single piece of a common motor having a large capacity may be arranged at the main body portion 230, and a torque from the common motor may be transmitted respectively to the air compressor 218 and the sealing agent pump 240 by way of a torque transmitting mechanism of a gear train mechanism, a belt/pulley mechanism or the like. In this case, although the torques to the air compressor 218 and the sealing agent pump 240 may be controlled to transmit and cut by using a mechanism of controlling to transmit the torques of electromagnetic clutches or the like, one way clutches may be interposed respectively between the common motor and the air compressor 218 and between the common motor and the sealing agent pump 240, when the common motor is rotated in a regular rotating direction, the torque is transmitted only to the side of the sealing agent pump 240, and when the common motor is rotated in a reverse rotating direction, the torque may be transmitted only to the air compressor 218.

EXAMPLE 1

First Experimental Example

There is carried out an experiment of repairing puncture by using the pump up apparatus 30, 60, 80 according the first through the third embodiments of the invention and evaluating a liquid amount of a sealing agent which can be supplied to a pneumatic tire, and a maximum current in using the apparatus. A voltage applied to the apparatus is set to 14 V. Table 1 shows an evaluation result of cases of using the pump up apparatus 30, 60, 80 respectively as Embodiments 1, 2, 3. Further, for comparison, an evaluation is carried out by executing an experiment similarly also for a case of repairing puncture by using the pump up apparatus 20 of the conventional art. An evaluation result thereof is also shown in Table 1 as a comparative example.

TABLE 1

|  |  | Embodiment 1 | Embodiment 2 | Embodiment 3 | Comparative example |
|---|---|---|---|---|---|
| liquid amount of sealing agent which can be supplied to pneumatic tire | normal use (%) | 95 | 95 | 95 | 95 |
|  | use by bringing down sideway (%) | 95 | 95 | 95 | 60 |
| tire inner pressure after elevating pressure (kgf/cm$^2$) |  | 2 | 2 | 2 | 2 |
| maximum use current (A) |  | 10 | 14 | 10 | 10 |

As is understood from Table 1, although a liquid amount of a sealing agent which can be supplied to a pneumatic tire from a sealing agent vessel is 95% in all of Embodiments 1 through 3 and Comparative example in a case of a normal use, that is, when a state of mounting the apparatus is normal, when the apparatus is laid down (that is, brought down sideways) to be used, whereas the liquid amount is 95% in Embodiments 1 through 3, only 60% thereof can be supplied in Comparative example.

Further, although in any of the cases, an inner pressure of a pneumatic tire after elevating the pressure by the compressor can be elevated 2 kgf/cm$^2$ which is a designated inner pressure, a maximum used current at that occasion is 14 A in a case of Embodiment 2, that is, when a sealing agent pump and a compressor are simultaneously driven always, the maximum used current is 10 A in any of Embodiments 1, 3 and Comparative example.

Second Experimental Example

There is carried out an experiment of repairing puncture by respectively using the sealing pump up apparatus 140 (integrated type with the inner pressure adjusting mechanism) according to the sixth embodiment and the sealing pump up apparatus of the conventional art and measuring an operational time period from start to end of operation. In the experiment, there are used sealing pump up apparatus of the conventional art in which a sealing agent injecting apparatus for injecting a sealing agent into a pneumatic tire and a pump up apparatus for supplying compressed air into the pneumatic tire (two member type without inner pressure adjusting mechanism) and the apparatus which is not provided with an inner pressure adjusting mechanism of a pneumatic tire although the sealing agent injecting apparatus and the pump up apparatus are integrated similar to the sealing pump up apparatus 140 (integrated type without inner pressure adjusting mechanism), respectively.

At this occasion, as the operator, there is selected a person which has not repaired puncture by using the sealing pump up apparatus, and one operator is made to execute puncture repairing operation once by using any of the sealing pump up apparatus. The puncture repairing operation is carried out in this way by 20 times by respective sealing pump up apparatus and average values of operational time periods are calculated for the respective sealing pump up apparatus. A result thereof is shown in Table 2 described below.

TABLE 2

|  | time of elevating pressure of compressor (minute) | other operational time period (minute) | total operational time period (minute) |
|---|---|---|---|
| two member type without inner pressure adjusting mechanism | 8.6 | 12.6 | 21.2 |
| integrated type without inner pressure adjusting mechanism | 8.2 | 2.0 | 10.2 |
| two member type with inner pressure adjusting mechanism | 5.0 | 2.0 | 7.0 |

As is apparent from Table 2, by providing the sealing pump up apparatus with the inner pressure adjusting mechanism (control unit 142) for automatically adjusting the inner pressure of the pneumatic tire to the designated pressure, in comparison with the apparatus which are not provided with the inner pressure adjusting mechanism, a pressure elevating time period can considerably be shortened, as a result, a total operational time period can also be shortened.

DESCRIPTION OF REFERENCE NUMERALS AND SIGNS

30 pump up apparatus
34 sealing agent vessel
36 sealing agent
38 tire (pneumatic tire)
42 sealing agent pump
44 compressor
56 vane type pump
58 screw type pump
60 pump up apparatus
62 sealing agent pump
64 compressor
66 motor
80 pump up apparatus
86 motor
90 venturi type pump
92 pump up apparatus
94 common pump
108 motor
120 pump up apparatus
128 check valve
134 alarmer
140 sealing pump up apparatus
140 pump up apparatus
142 control unit
146 timer
148 pressure sensor
150 stop control circuit
152 check valve
155 alarmer
210 pump up apparatus
218 air compressor
220 compressor motor
232 sealing agent vessel
234 sealing agent
236 pump motor
240 sealing agent pump
254 check valve
256 attachable/detachable unit

The invention claimed is:

1. A sealing pump up apparatus that injects a sealing agent in a liquid state into a punctured pneumatic tire, thereafter, elevates an inner pressure by supplying compressed air into the pneumatic tire, the sealing pump up apparatus comprising:
   a sealing agent vessel containing the sealing agent;
   a sealing agent pump that sucks the sealing agent from the sealing agent vessel to feed the sealing agent to the pneumatic tire;
   an air compressor that pressurizes and sends air to the pneumatic tire;
   a pump motor that transmits a torque to the sealing agent pump;
   a gas/liquid common pipe an one end portion of which is connected to the sealing agent injecting pump and another end portion of which is connectably and disconnectably connected to the pneumatic tire;
   a branch pipe which is branched from a middle portion of the gas/liquid common pipe, and is connected to the air compressor; and
   an attachable/detachable unit which is attachable and detachable to and from a main body portion of the apparatus at which the sealing agent vessel, the pump motor and the air compressor are arranged, and at which the sealing agent pump, the gas/liquid common pipe and the branch pipe are respectively mounted;
   wherein, when the attachable/detachable unit is installed to the main body portion, in cooperation with an operation of installing the attachable/detachable unit to the main body portion, the sealing agent pump and the branch pipe are respectively connected to the sealing agent vessel and the air compressor and the pump motor is connected to the sealing agent pump so as to be able to transmit the torque.

2. The sealing pump up apparatus according to claim 1, characterized in that the sealing agent pump and the air compressor individually include power sources.

3. The sealing pump up apparatus according to claim 1, characterized in that the sealing agent pump and the air compressor include a common power source.

4. The sealing pump up apparatus according to claim 1, characterized in that any of a vane type pump, a reciprocal type pump, a screw type pump, and a gear pump is used as the sealing agent pump.

5. The sealing pump up apparatus according to claim 1, characterized in that either of a reciprocal type air compressor or a screw type air compressor is used as the air compressor.

6. A sealing pump up apparatus that injects a sealing agent in a liquid state into a punctured pneumatic tire, thereafter, elevates an inner pressure by supplying compressed air into the pneumatic tire, the sealing pump up apparatus comprising:
   a sealing agent vessel containing the sealing agent;
   a common pump that feeds a fluid to the pneumatic tire while sucking the fluid from outside by way of a suction port; and
   switching means for selectively communicating the suction port to one of the sealing agent vessel and an outside space;
   wherein the common pump is used as a sealing agent pump that sucks the sealing agent from the sealing agent vessel to feed the sealing agent to the pneumatic tire, the suction of which is communicated with the sealing agent vessel by the switching means, and the common pump is also used as an air compressor that pressurizes and sends air to the pneumatic tire, the suction port of which is communicated with the outside space by the switching means.

7. The sealing pump up apparatus according to claim 1 comprising:

inner pressure detecting means for detecting an inner pressure of the pneumatic tire and outputting a detecting signal in correspondence with a detected value of the inner pressure;

inner pressure setting means for setting a designated value of the inner pressure previously designated for the pneumatic tire in accordance with an operation from outside of the apparatus; and pressure elevation stopping means for determining the inner pressure of the pneumatic tire to which air is pressurized and sent by the air compressor based on the detecting signal from the inner pressure detecting means, and stopping pressurizing and sending air from the air compressor to the pneumatic tire when the inner pressure of the pneumatic tire reaches the designated value.

8. The sealing pump up apparatus according to claim 1 comprising:

inner pressure setting means for setting a designated value of the inner pressure previously designated for the pneumatic tire in accordance with an operation from outside of the apparatus; and a pressure adjusting valve for stopping elevating the pressure of the pneumatic tire by exhausting air pressurized and sent by the air compressor to outside when the inner pressure of the pneumatic tire reaches the designated value.

9. The sealing pump up apparatus according to claim 7 comprising:

inner pressure informing means for visually or vocally informing, to outside of the apparatus, of that the inner pressure of the pneumatic tire reaches the designated value when the inner pressure of the pneumatic tire reaches the designated value.

10. The sealing pump up apparatus according to claim 1, characterized in that, when the attachable/detachable unit is detached from the main body portion, in cooperation with an operation of detaching the attachable/detachable unit from the main body portion, the sealing agent pump and the branch pipe are respectively separated from the sealing agent vessel and the air compressor and the sealing agent pump is separated from the pump motor.

11. The sealing pump up apparatus according to claim 1, characterized in that a check valve that prevent the sealing agent and compressed air from flowing back to the sealing agent pump from a side of the pneumatic tire via the gas/liquid common pipe is mounted on the attachable/detachable unit.

12. The sealing pump up apparatus according to claim 1, characterized in that the sealing agent vessel is attachably and detachably mounted to the main body portion.

* * * * *